United States Patent [19]
Hoyt et al.

[11] Patent Number: 6,067,531
[45] Date of Patent: May 23, 2000

[54] AUTOMATED CONTRACT NEGOTIATOR/ GENERATION SYSTEM AND METHOD

[75] Inventors: Daniel M. Hoyt, Manitou Springs; Robin M. Lee; Alan L. Lickiss, both of Colorado Springs, all of Colo.

[73] Assignee: MCI Communications Corporation, Washington, D.C.

[21] Appl. No.: 09/120,014

[22] Filed: Jul. 21, 1998

[51] Int. Cl.[7] .................................................. G06F 17/60
[52] U.S. Cl. ............................................. 705/35; 705/35
[58] Field of Search ................................. 705/35, 4, 29; 707/200, 530, 531; 709/238, 227; 395/701

[56] References Cited

U.S. PATENT DOCUMENTS

| | | | |
|---|---|---|---|
| 5,008,853 | 4/1991 | Bly et al. ........................ | 705/29 |
| 5,181,162 | 1/1993 | Smith et al. ..................... | 707/530 |
| 5,272,623 | 12/1993 | Grubb et al. .................... | 395/701 |
| 5,446,653 | 8/1995 | Miller et al. .................... | 705/4 |
| 5,623,653 | 4/1997 | Matsuno et al. ................. | 707/200 |
| 5,666,490 | 9/1997 | Gillings et al. ................. | 709/238 |
| 5,692,206 | 11/1997 | Shirley et al. ................... | 707/531 |
| 5,732,219 | 3/1998 | Blumer et al. ................... | 709/227 |

*Primary Examiner*—Tod R. Swann
*Assistant Examiner*—Forest O Thompson, Jr.

[57] ABSTRACT

A contract system automates negotiation and generation of contract documents by managing the work flow in a contract approval process. Multiple users, coupled by a computer network, access a contract database containing multiple contracts with multiple contract components therein. The system manages communications and security between a client system and the contract database. A client applet facilitates user input at the client system and assists in a standardization of legal phrasing and contract negotiation. The client applet enforces business rules to qualify a contract for expedited approval. Generalized templates are employed to enable rapid prototyping and creation of new contracts. A method governs the automated contract negotiation and generation process within a business organization with assistance from a graphical user interface.

49 Claims, 24 Drawing Sheets

AUTOMATED CONTRACT NEGOTIATOR/ GENERATION SYSTEM AND METHOD

BACKGROUND OF THE INVENTION

1. Field of the Invention

The present invention pertains generally to electrical computers and more particularly to systems and methods for automating the negotiation and generation of a contract.

2. Description of Related Art

Sales contracts are important elements of modern business. Among other characteristics, a modern sales contract typically includes business terms (such as prices, quantities, delivery dates and discounts), legal phrasing, and approvals by the parties. A single large sales contract may be quite complex and require input from diverse groups within a business organization, including a legal department, a business department, and other appropriately authorized personnel. Other parties to the contract may also provide input requiring modification to contract language and terms. Furthermore, large businesses are often drafting, negotiating, and executing multiple contracts with various parties simultaneously. As such, managing the contract flow and approval process for such concurrent contracts presents considerable obstacles and risks to proper contract negotiation and generation. In addition, these difficulties are commonly amplified by time constraints introduced by typical business pressures.

The advent of computer systems and networks has provided some attractive opportunities for computer assistance of contract generation; however, computer systems and networks have also introduced new difficulties and amplified old ones. For example, modern contracts are typically emailed to the various contract parties and their agents for revision, negotiation, and approval. Edits may be made to the electronic document contained in the email and rerouted to the parties for review. Recipients may also print hard copies of such electronic documents for review and editing purposes. Such uncontrolled proliferation of electronic and hard copy contract documents presents version control concerns, unauthorized disclosure risks, unauthorized modification risks, and interruptions in the approval process.

Products have also been introduced to assist a user in drafting contracts. Such products typically provide boilerplate legal phrasing from which a user may select choices of fill-in-the-blank legal clauses. One such product, the Quicken Family Lawyer Deluxe by Intuit, Inc., asks a user a series of context-sensitive questions and combines provisions and terms determined to be appropriate for the answers provided.

These approaches lack significant characteristics desired by a large business seeking to automate the contract generation process. As discussed, a document-based, or e-mail-based, approach present document proliferation risks and approval process delays. Furthermore, products like Quicken Family Lawyer Deluxe do not provide desired workflow management, such as access control, approval coordination, or collaboration features. Therefore, need exists for an automated contract negotiation and generation system providing groupware-like collaboration mechanisms, version control, and workflow management. Moreover, need exists for an automated contract negotiation and generation system capable of applying defined business constraints to expedite the approval process of contracts therein.

BRIEF SUMMARY OF THE INVENTION

It is an object of the present invention to provide a system that automates contract negotiation, approval, and generation among multiple users coupled by a network.

It is another object of the present invention to provide a method for using a computer system and network to automate contract negotiation, approval, and generation.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, in accordance with the purposes of the present invention, as embodied and broadly described herein, the system of this invention may comprise a sharable contract database of editable data defining a contract as a plurality of discrete contract components that has a class level assigned to each user in a hierarchy of users having access to the sharable contract database; a contract status indicator field in the sharable contract database that indicates a negotiation status of the contract and is capable of changing during an automated contract negotiation process; and at least one database field in the sharable contract database that indicates a dynamic user access mode based on the class level and the contract status indicator, the user access mode being capable of preventing a user in the hierarchy of users from changing the editable data in the sharable contract database.

The present invention may also comprise, in accordance with its object and purposes, a method having the steps of providing a web server computer that stores a contract negotiator applet; providing a client computer coupled to the web server computer; loading the contract negotiator applet to the client computer from the web server computer; executing the contract negotiator applet on the client computer; providing a contract database coupled to a broker; and accessing the contract database by the contract negotiator applet via the broker.

A system in accordance with the present invention provides advantages over other computer-based contract systems. Such a system stores all contracts and all contract components in a central repository or contract database. Multiple users may access the contract data for which they are responsible based on predefined access rights and hierarchies. The status of a contract at any single point in the automated process assists in controlling access to the contract database and defines the next approval level required in the contract approval flow. When a contract is approved, a new version of the contract is generated, and the previous version is maintained within the system so that a user can view previous versions of the contract. The system also allows standardized contract clauses to be used throughout the system and also allows customized information to be entered into the contract database. The system supports expedited approval policies by applying business rules to control specific contract terms.

BRIEF DESCRIPTION OF THE DRAWINGS

FIG. 11 illustrates a screen for selecting an account team responsible for a selected contract.

FIG. 14 illustrates an exemplary Quick Close template in accordance with the present invention.

DETAILED DESCRIPTION OF THE INVENTION

Figure 1:
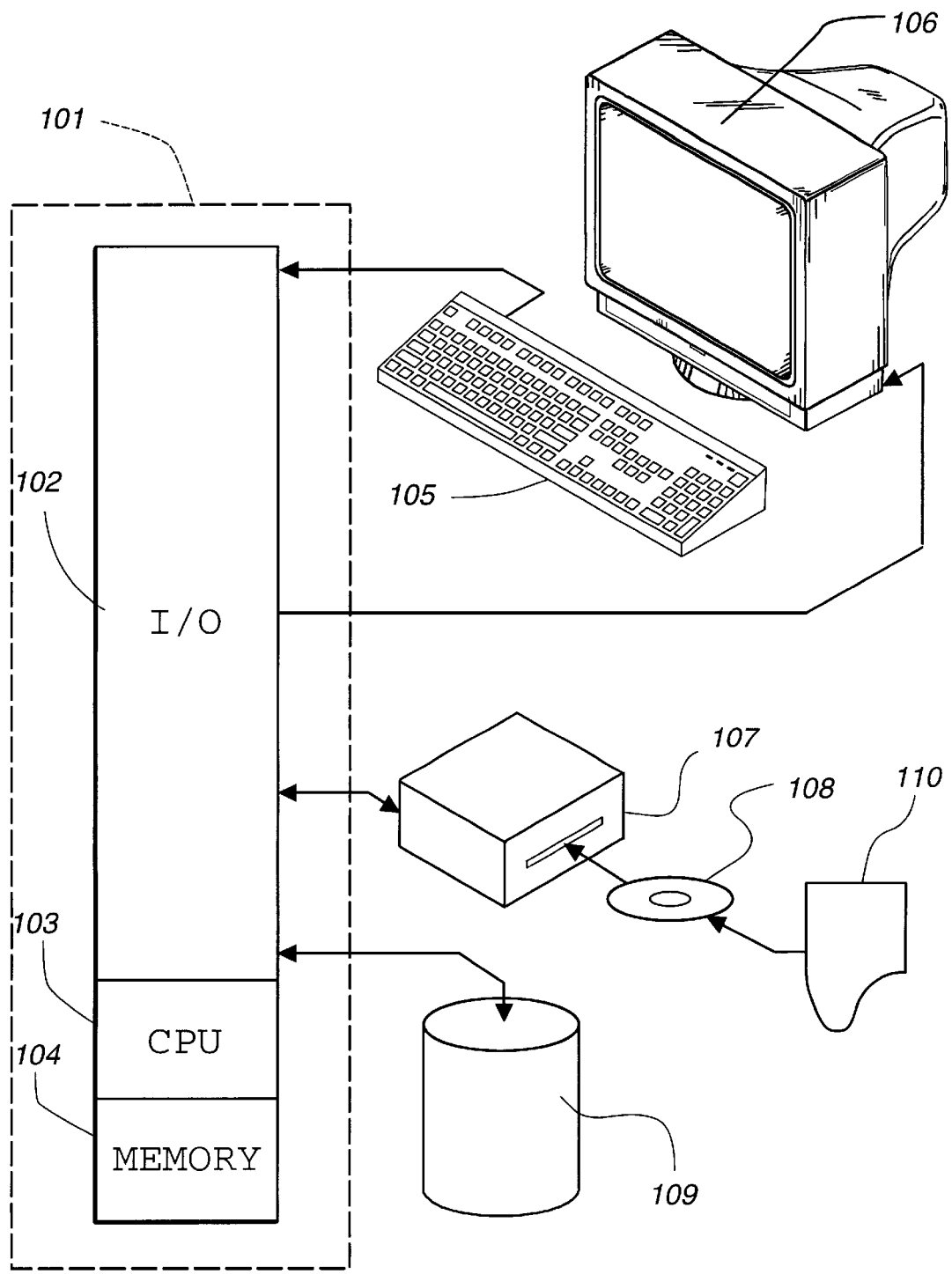
FIG. 1 depicts a general purpose computer capable of operating as a database server, a web server, or a web client executing an applet embodiment in accordance with the present invention.

One operating environment in which the present invention is potentially useful encompasses the general purpose computer. In such a system, data and program files may be input to the computer, which reads the files and executes the programs therein. Some of the elements of a general purpose computer are shown in FIG. 1, wherein a processor 101 is shown having an input/output (I/O) section 102, a Central Processing Unit (CPU) 103, and a memory section 104.

The I/O section 102 is connected to keyboard 105, display unit 106, disk storage unit 109, and disk drive unit 107. Generally, in contemporary systems, the disk drive unit 107 is a CD-ROM driver unit capable of reading a CD-ROM medium 108, which typically contains programs 110 and data. Computer program products including mechanisms to effectuate the system and methods in accordance with the present invention may reside in the memory section 104, on a disk storage unit 109, or on the CD-ROM medium 108 of such a system. Alternately, disk drive unit 107 may be replaced by a floppy drive unit, a tape drive unit, or other storage medium drive unit. Examples of such systems include SPARC systems offered by Sun Microsystems, Inc., personal computers offered by IBM Corporation and by other manufacturers of IBM-compatible personal computers, and other systems running the UNIX-based operating system. In accordance with the present invention, procedural components of a program product may be executed by CPU 103, and the program product and associated data may be stored on disk storage unit 109, disk drive unit 107 or other storage medium drive unit coupled to such system.

Figure 2:
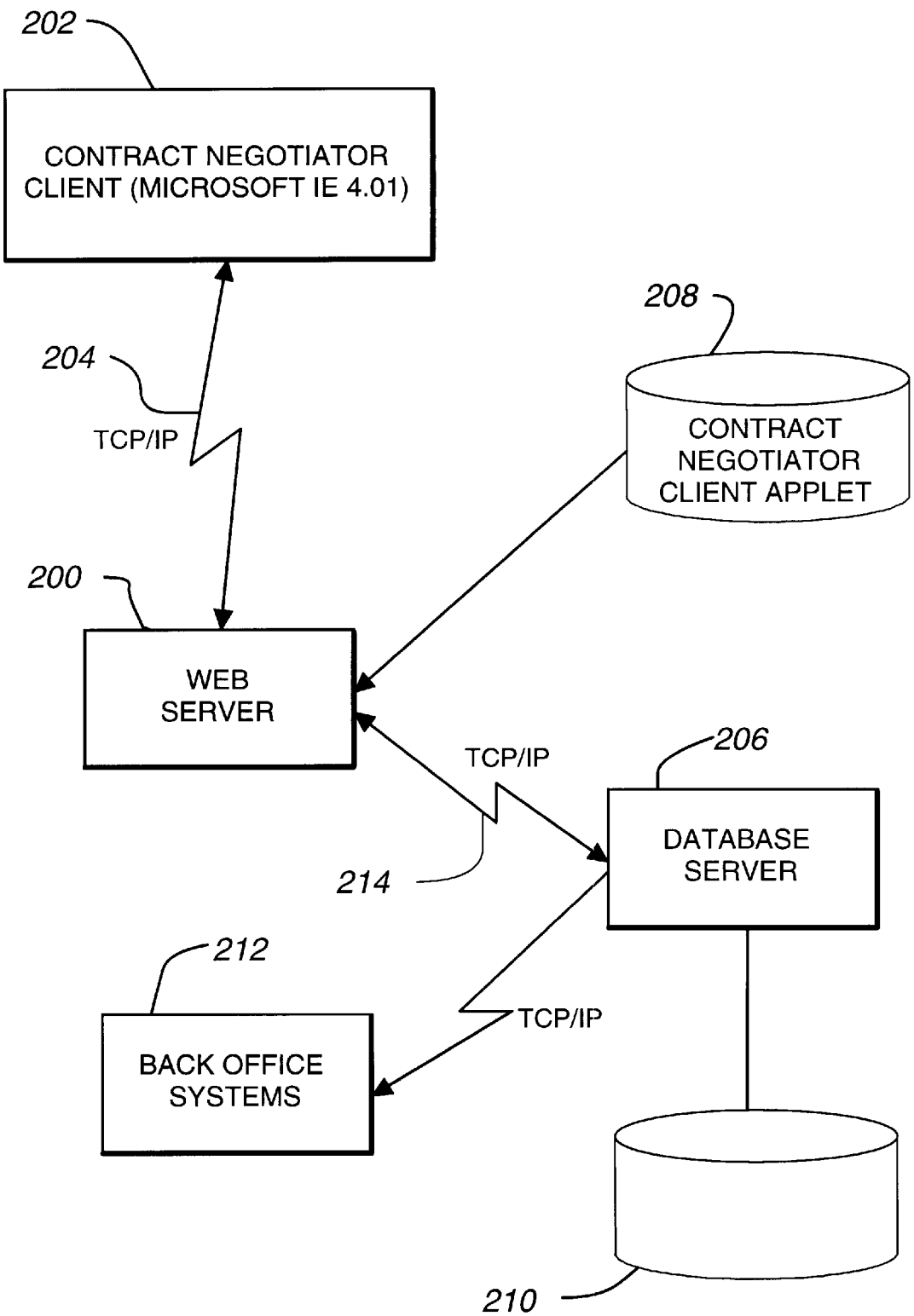
FIG. 2 depicts a high level overview of a system in accordance with the present invention.

FIG. 2 illustrates the logical architecture of a preferred embodiment of the present invention. Web server 200 provides access to a computer network, such as a LAN, a WAN, an Internet, an Intranet, and an Extranet, and has access to a JAVA™ Contact Negotiator Client Applet 208 applet loaded on a storage medium. In a preferred embodiment, the JAVA applet provides the Graphical User Interface (GUI) of an automated contract negotiator and generator system and conducts communications between Contract Negotiator client system 202 and web server 200. Contract Negotiator Client system 202 is coupled to web server 200 via a TCP/IP network 204 or any other suitable network. A user may access web server 200 using a standard web browser, such as Microsoft Internet Explorer 4.01. Such a user may enter a specific URL (i.e., web site address) into the web browser at Contract Negotiator client system 202 to access a web site on web server 200. When a network connection is established between the client system 202 and the web server 200, the JAVA applet is accessed by web server 200 and loaded into Contract Negotiator client system 202, which then executes the JAVA applet. Because the JAVA applet does not reside on Contract Negotiator client system 202 until it is downloaded via web server 200, the applet is known as a "zero-footprint" application.

JAVA is a programming language similar in syntax to C++. When JAVA is initially compiled, the result is a "byte-code" set of instructions. The byte-code instructions operate on a web browser that, in turn, issues the i instructions to the operating system. The web browser is specific to the platform on which it is executing, whereas a JAVA applet is generally platform-independent because the JAVA code is actually executed within a JAVA Virtual Machine (JVM). A JVM interprets platform-independent byte-code instructions for execution on a specific platform. A JVM may also compile the downloaded byte-code instructions to produce machine code for the specific platform. JAVA applets also have restricted access to system resources to prevent unauthorized access to a client system by an Internet-borne applet or virus.

The web browser on Contract Negotiator client system 202 may execute both byte-code instructions and machine code. Contract and user data used by the contract negotiator application is stored on storage medium 210 and serviced by database server 206, which runs Informix software on a dual-processor Digital UNIX system in a preferred embodiment. The JAVA applet accesses the contract and user data through the web server 200, which runs Microsoft Windows NT 4.0 software on an HP NetServer Pro in a preferred embodiment. Web server 200 accesses the contract and user data via communication with database server 206 over TCP/IP network 214.

Furthermore, a system in accordance with the present invention may interface to other corporate back-office applications. Database server 206 is coupled via a TCP/IP link to corporate back-office systems 212, commonly on mainframe MVS systems running back-office applications. Customized application procedural interfaces (APIs) are generally used to accomplish the back-office communication. One example of a back-office system is a billing order entry system. Such a system is an order entry system that is used to establish hierarchies within a customer's corporate structure and to store discount contract information. The system builds corporate customer billing hierarchies, and feeds these to billing systems for multiple-level invoicing. An interface to the billing order entry system may be used to automate further procedures. For example, once a contract has been finalized and approved (the status for which is maintained in the contract database), the system may issue a message to the back-office billing order entry system, thereby triggering installation or activation of the services for that customer. The back-office system can also send messages to the database server to update the contract database with contract status changes that result from services activated in the back-office system.

Figure 3:
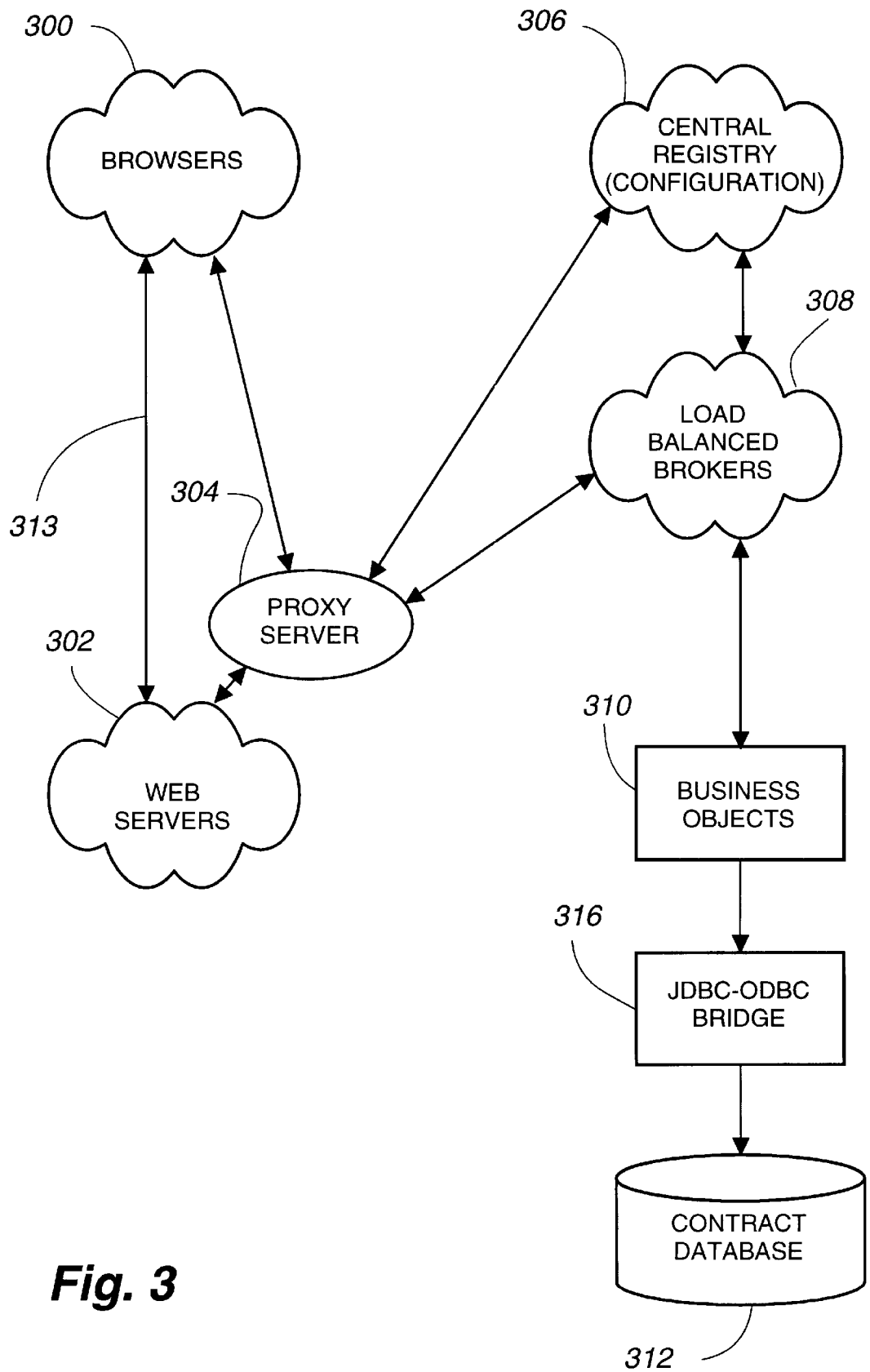
FIG. 3 depicts a high level overview of the client-server component architecture in accordance with a present invention.

FIG. 3 illustrates the architecture of a system for executing a contract negotiator in accordance with the present invention. The system employs a reusable client-server component architecture, herein called "netRoaster." The netRoaster subsystem resides between proxy server 304 and brokers 308. The netRoaster client element operates on proxy server 304. The netRoaster server element operates on brokers 308. In addition, a "webRoaster" component is combined with the JAVA applet and executed by browser 300. Proxy server 304 operates as the webRoaster server, and browser 300 operates as the webRoaster client. In the preferred embodiment of the invention, a webRoaster component is combined with a contract negotiator JAVA applet embodying the GUI and communications functionality of the contract negotiator. Client system 300 executes a web browser, such as Microsoft Internet Explorer 4.01, which executes one or more client applets. Web server 302 distributes the most current client applet code to client system 300 upon request via a TCP/IP network connection 313.

Client system 300 is also connected to proxy server 304 via a TCP/IP network. Proxy server 304 runs on the same physical machine as web server 302 and is used by webRoaster to provide access to the underlying scaleable database server and architecture (i.e., the netRoaster subsystem). Proxy server 304 obtains a reference to the least loaded of brokers 308 for each unique client-server connection. Brokers 308 provide web server 302 with access to data in contract database 3 12 through a database server and business objects 310. Brokers 308 also provide automatic tracking of unique, persistent memory stores available to each client. Moreover, brokers 308 provide extensibility, because business objects 310 may be scaled to support changing requirements without affecting a concurrently running netRoaster subsystem.

Central registry 306 is the first component initiated in a netRoaster architecture. Central registry 306 provides plug-and-play configuration, so that authorized brokers and clients need only know the DNS (Domain Naming System) name of the central registry in order to gain access to the netRoaster subsystem. Central registry 306 also provides scaleability, because brokers 308 are started after central registry 306 and, thereafter, individually register themselves with central registry 306. Furthermore, central registry 306 is responsible for maintaining a list of currently available brokers 308 at all times. New brokers may be brought on-line dynamically (i.e., without any reconfiguration). Central registry 306 also allows dynamic load-balancing of brokers 308 to insure that each new client-server connection request is routed to the least loaded broker upon request. Brokers 308 provide the traditional server tier in a multiple tiered client-server communication model.

After at least one of broker 308 has been started successfully, the client applet (also known as a webRoaster applet, since it includes the standard webRoaster component) may be started. The webRoaster applet provides the client applet GUI in a separate browser frame on client system 300. A webroaster applet looks equivalent to a standalone application, however, it still has the same access restrictions as any other JAVA applet. The webRoaster applet also provides a GUI screen engine that simplifies access to the netRoaster architecture.

The webRoaster applet connects to proxy server 304, which is used by webRoaster applets to provide access to the scaleable netroaster architecture. After proxy server 304 obtains a reference to the least-used broker for a particular client-server connection, it then connects to the referenced broker via a JAVA Remote Method Invocation (RMI). If a broker connection is lost, proxy server 304 provides access to a standby broker or web server (automatic fail over). Proxy server 304 also provides proxy communications between the webRoaster applet and the netRoaster broker, which allows the broker to interact with a webRoaster applet as if it were a standard netRoaster client application.

Business objects 310 provide the means for the netRoaster brokers 308 to interact with the contract database 312. Business objects 310 provide a database-independent abstraction layer for supporting client-server interactions with database 312 based on business functions, not merely database calls.

Business objects 310 also provide reusable components to satisfy business needs. Business objects 310 also use an industry-standard ODBC (object-oriented database connectivity) interface via the JDBC-ODBC bridge 316, where JDBC means "JAVA Database Connectivity." The use of business objects 310 enables more efficient development by reducing co-dependencies between client and server development teams.

Figure 4A:
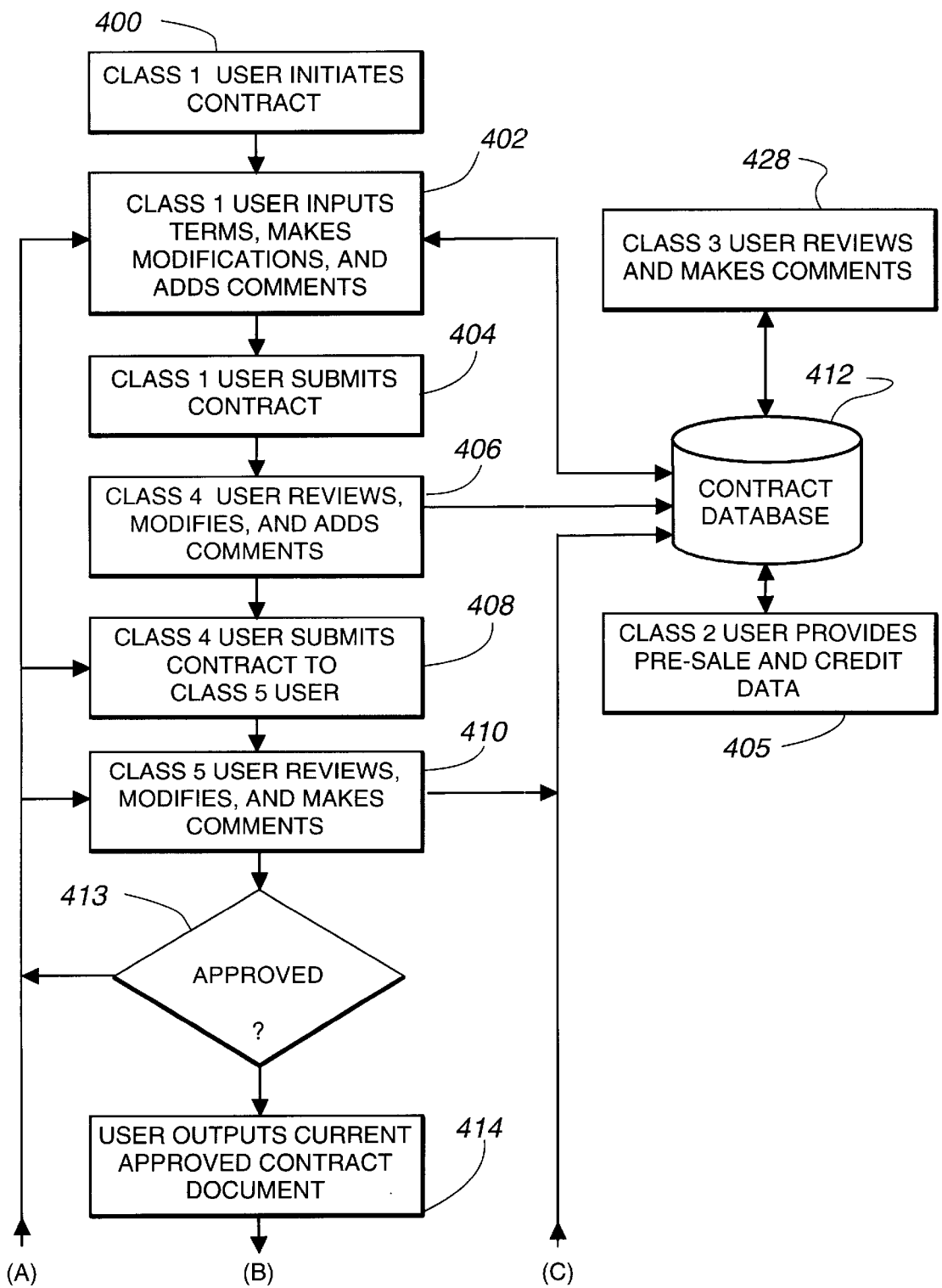
FIGS. 4A and 4B depict a flow chart illustrating an automated contract negotiation system in accordance with the present invention.
Figure 4B:
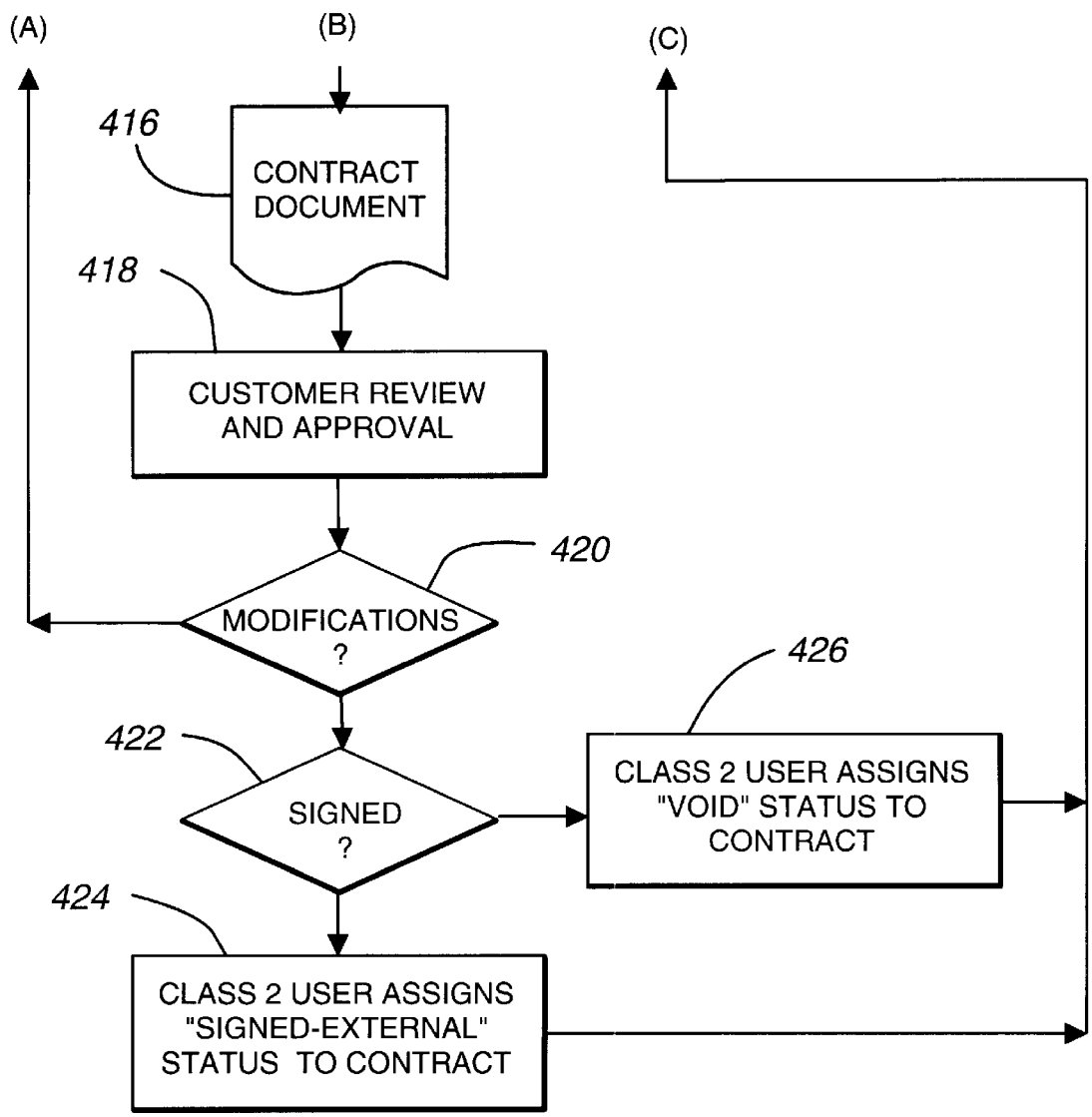

A preferred method of automatically negotiating and generating a 30 contract, in accordance with the present invention, is depicted in FIGS. 4A and 4B. There are six classes of users currently defined for a preferred embodiment of the present invention, but a greater or lesser number of user classes is feasible without departing from the characteristics of the present invention. These classes represent, in part, approval levels needed for contracts. The number and definition of user classes depends on the business process supported by a contract negotiator system. The configuration of user levels described herein correspond to a particular embodiment of the present invention, but other configurations are also contemplated in accordance with the present invention.

In this configuration, the first user class (Class 1) comprises sales representatives, who generally initiate each sales contract. Class 2 comprises pre-sale analysts, who make initial business and credit evaluations and provide pre-sale information regarding the Class 1-proposed sale contract. Class 3 comprises of branch management, who may review and make comments regarding ongoing contracts, but who do not modify contracts through the contract negotiator system. Class 4 users comprise business development analysts, who must approve the business characteristics of the proposed contract before the contract is executed. Class 5 comprises legal personnel who, at certain stages in the negotiation and generation process, have full access to all aspects of the contract data, subject to contract status restrictions. Also, in a preferred embodiment of the present invention, an administrator class (Class 6) is defined to manage authorized users of the system, to input legal phrasing, and to adjust contract trees within the system.

A Class 6 administrator does not have authority to modify contracts within the negotiation and generation process, but may provide modifications to user's contract baselines, templates, and other system components that affect subsequently initiated contracts. Subclasses of users, called "point-class users" (e.g., class 2.1), may also be defined.

Each contract is assigned a "team" associated with a permanent hierarchy and comprising users from each class who are responsible for that particular contract. A Class 6 user initially assigns each Class 1 user with a permanent hierarchy. Non-Class 6 users cannot add other users to or remove other users from a Class 1 user's permanent hierarchy. Other, non-permanent users may be added to the contract team by any class of user. Each contract further specifies a minimum and maximum number of users at each level of hierarchy required to completely review and approve the contract. For example, a particular contract may require a minimum of one Class 2 user and a maximum of three Class 2 users in its team.

As depicted in FIGS. 4A and 4B, a Class 1 user initiates a new contract in block 400 and inputs proposed contract terms and comments in block 402. When the Class 1 user initiates a contract, the contract negotiator system automatically assigns team members according to the Class 1 user's permanent hierarchy. The permanent hierarchy comprises users from each class, except Class 6, who are immediately and permanently responsible for that particular contract, and represents part of a contract team.

When a user logs into a contract negotiator, they are presented with a list of those contracts to which they are assigned as a team member. The list also includes a contract status and serves to solicit reviews and/or approvals from higher-class users. In block 404, the Class 1 user submits a contract, containing relevant terms and comments, into the contract negotiation process. After submission, all classes of team members may access (with appropriate class and status access restrictions) the contract. For example, Class 2 users may access the contract to provide pre-sale and credit review and to make comments regarding the contract (step 405). A Class 2 user may also "true up" contract database 412 to make it consistent with changes made to a corresponding hard-copy contract derived from the database. Except for these actions, Class 2 users have no other write-type access authority to contract database 412. Primarily, the Class 2 user performs informational and administrative tasks, not necessarily a strict "approval" task that impacts the system's workflow management. Likewise, in block 428, Class 3 users may review and make comments regarding the concurrently negotiated contract by accessing contract database 412 through the contract negotiator system, but Class 3 users have no write-type access authority to contract database 412.

A submitted contract proceeds to a Class 4 user (a business development analyst) in block 406, who manages the business impact of the contract. In block 408, the Class 4 user submits the proposed contract to the Class 5 user in the legal department, who may, in block 410, add to or modify the contract, or return it to the other users in the hierarchy for modification and review. In a preferred embodiment of the present invention, the modifications to the contract are made in a central repository (i.e., contract database 412) accessed through a contract negotiator system.

The contract may flow among the class users until all members of the contract team are satisfied with the terms and language of a contract (referred to as "automated negotiation" herein). When all required levels of approval have been obtained in block 413, a user in block 414 may obtain an executable copy of the contract 416 (e.g., by printing out a hard copy) and send it to the customer for review and/or execution in block 418. If the customer makes or requires modifications to the contract terms in block 420, the changes may be entered into the automated contract negotiation system as described above. This process continues until a signed contract is obtained, or the contract generation is aborted (e.g., if the parties cannot reach agreement). If the contract is signed in block 422, a Class 2 user in block 424 assigns a "signed-external" status to the contract in contract database 412. If the contract is aborted, a Class 2 user in block 426 assigns a "void" status to the contract in contract database 412. Any modifications made to the contract document external to the contract database are amended in the database (or "trued up").

Figure 4C:
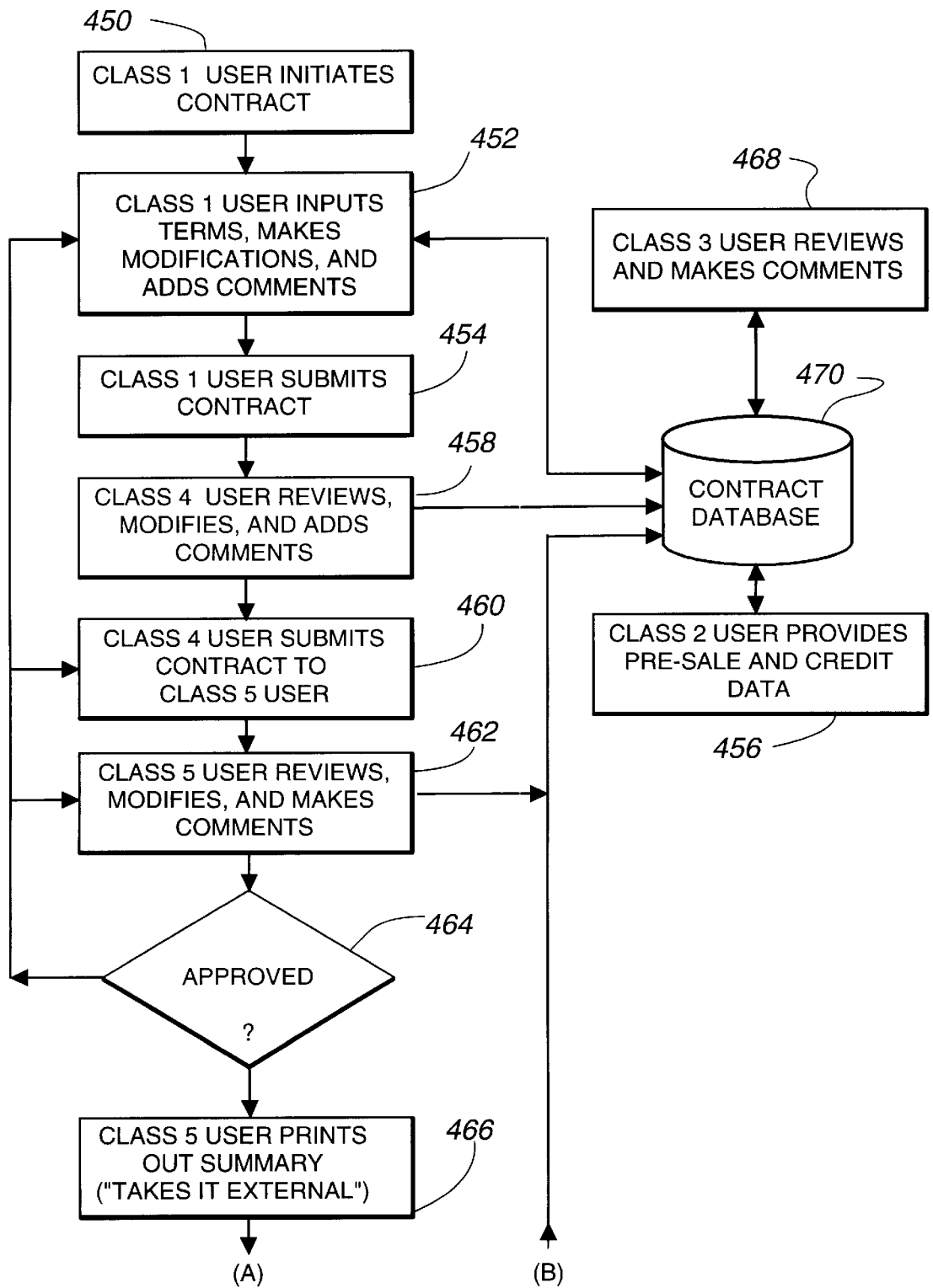
FIGS. 4C and 4D depict a flow chart illustrating an alternate embodiment of an automated contract negotiation system in accordance with the present invention.
Figure 4D:
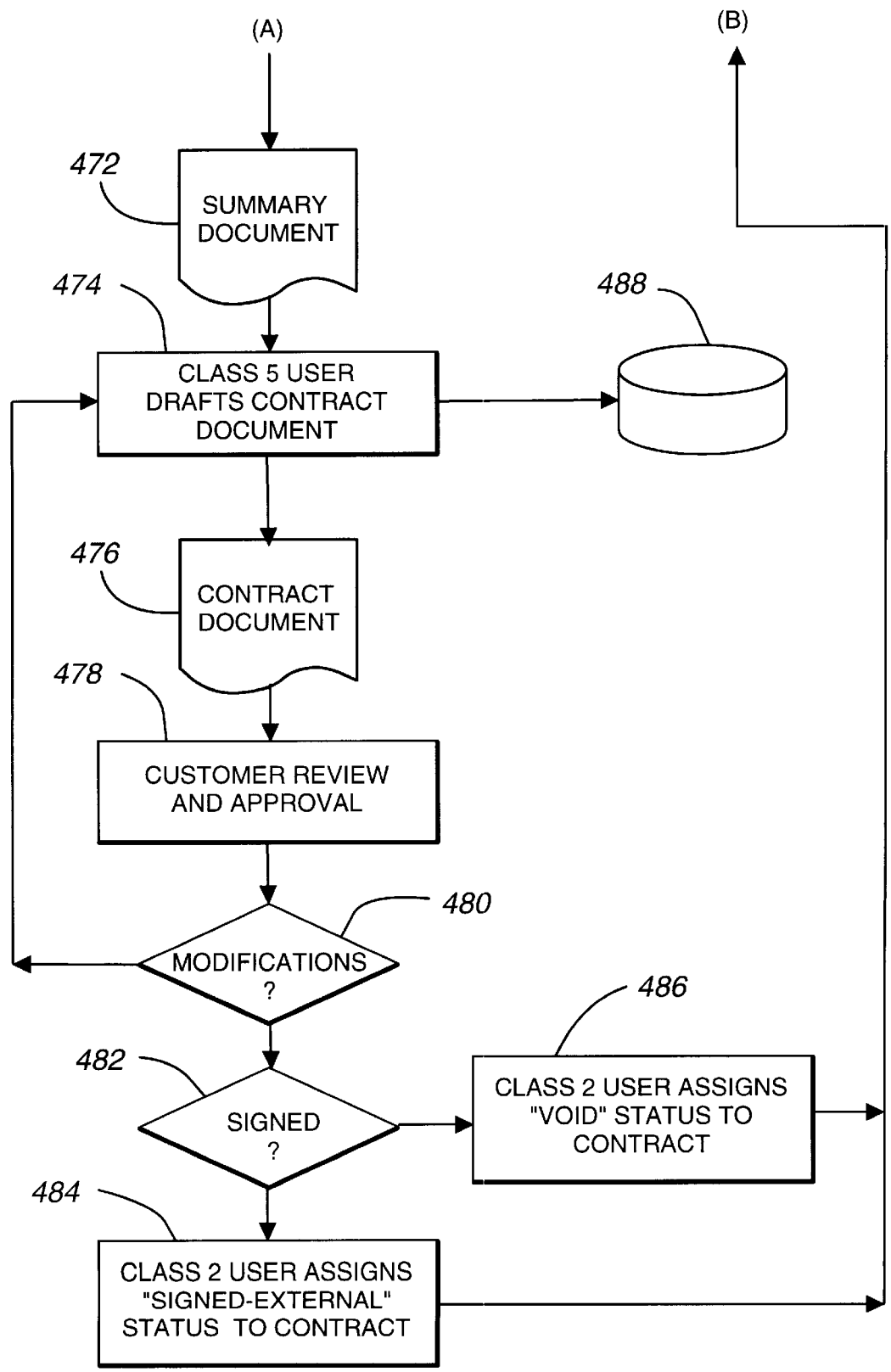

Alternately, another embodiment (illustrated in FIG. 4C and 4D) in accordance with the present invention requires that the legal department capture (in block 466) a summary 472 of the contract terms and legal phrasing determined in the negotiation process and manually incorporate this information into a hard copy or soft copy external document stored on an external storage medium 488. Subsequent modifications are made by the classified user in the contract document 476 rather than the contract database 470. Otherwise, the process is equivalent to the process of FIG. 4A.

Unlike alternate methods of computer-assisted contract generation, contract negotiator is a database-driven system, in which a contract comprises many components stored in different table entries in a database. Each contract is assigned a number (or ID) that is used as a key to the records in the various table entries containing components of the contract. As each contract is approved within a central repository or database, a snapshot of the approved contract becomes the next version. Users will have access to view all versions of the contract over the course of the negotiation.

Figure 5A:
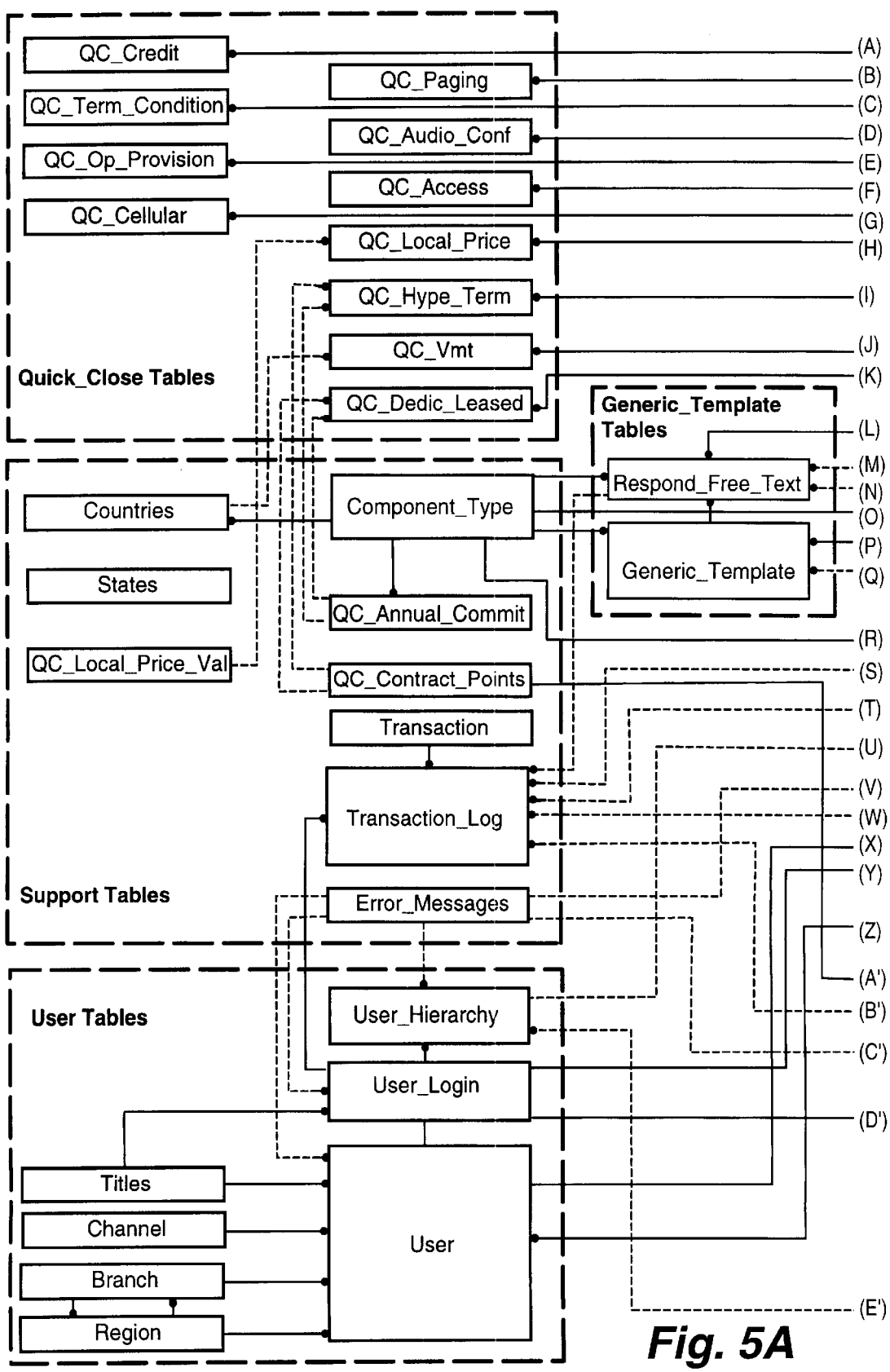
FIGS. 5A and 5B depict a diagram depicting data tables and table relationships in a database in accordance with the present invention.
Figure 5B:
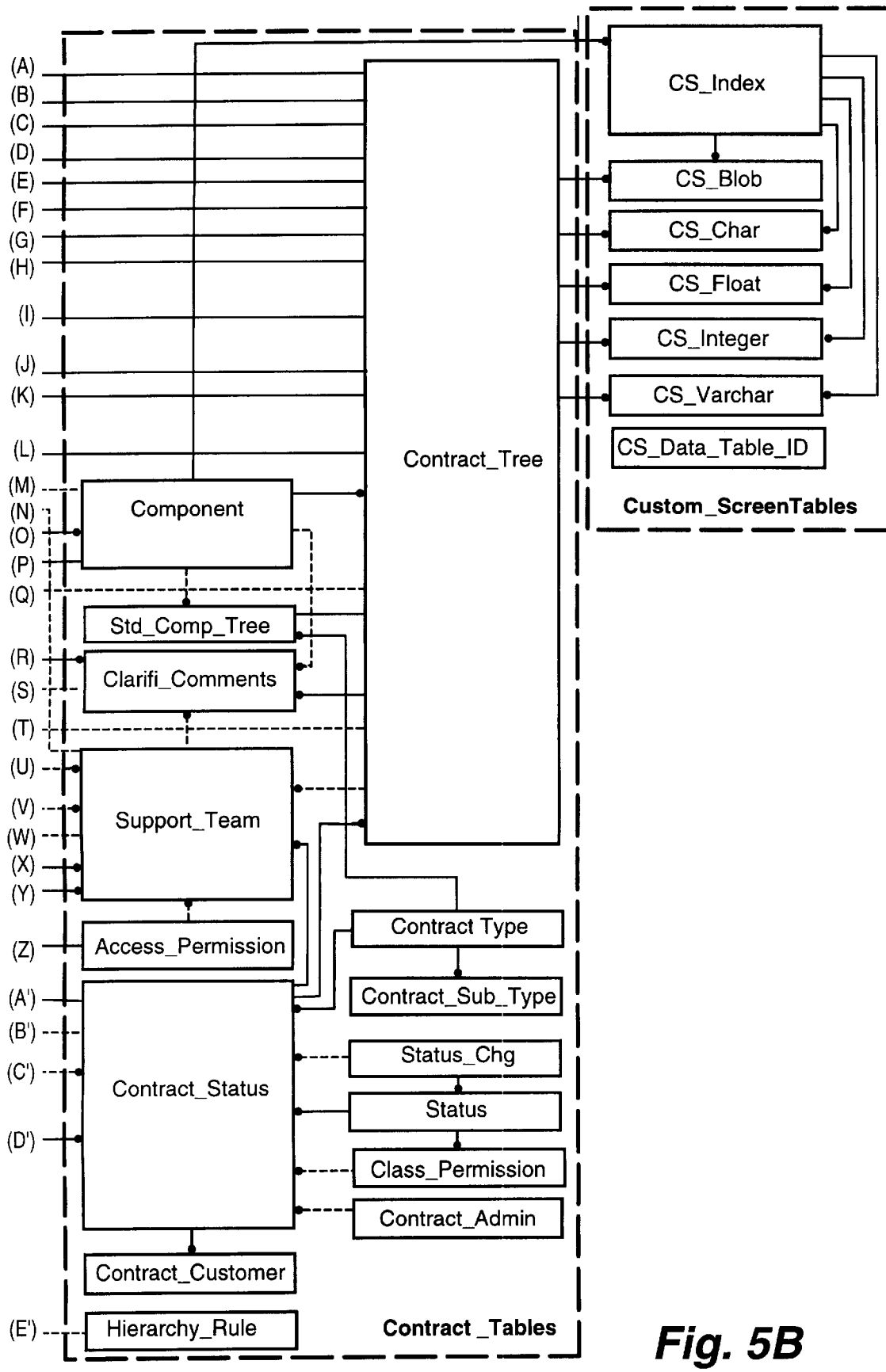

FIGS. 5A and 5B illustrate a database table diagram for a database in accordance with the present invention. Each table is identified by a labeled block in the figure, and the fields within each table are described within this specification. A solid interconnecting line represents a primary and foreign key relationship in the physical database. In addition, a dotted interconnecting line represents a programmatic relationship in a stored procedure, view, or trigger (e.g., tables that are updated together by software). Furthermore, an interconnecting line with a solid circle on one end represent a "one to many" relationship, where the end with the circle represents the "many" and the end without the circle represents the "one."

Five types of tables are managed in a contract negotiator database:
(1) user_tables; (2) contract_tables; (3) support_tables;
(4) generic_template_tables; (5) quick_close_tables; and
(6) custom_screen_tables. The user_tables include a User table,
a User_Hierarchy table, a User_Login table, a Branch table, a Channel table, a Region table, and a Title table. These tables are populated and managed by Class 6 users only.

The User table defines users who have access to the contract negotiator system and is depicted below:

TABLE

User

| Column Name | Key | Type | Size | Description |
|---|---|---|---|---|
| user_id | Y | CHAR | 10 | User ID (usually Social Security Number) |
| first_name | | VARCHAR | 20 | User's first name |
| middle_initial | | CHAR | 1 | User's middle initial |
| last_name | | VARCHAR | 25 | User's last name |
| title | Y | VARCHAR | 30 | User's title |
| vnet | | VARCHAR | 7 | VNET of user |
| department | | VARCHAR | 4 | Department number of user |
| location | | VARCHAR | 3 | Location code of user |
| branch | | INTEGER | | Branch ID |
| channel | | INTEGER | | Channel ID |
| region | | INTEGER | | Region ID |
| email | | VARCHAR | 25, 10 | Email address. |
| sales_city_cd | | VARCHAR | 4 | Sales City Code of user |
| access_flag | | CHAR | 1 | Team/National Access flag. Default is 'T' for team. |
| update_flag | | CHAR | 1 | Comment Only/Full Access flag. Default is 'F' for full access. |

The User_Hierarchy table is used to define a user hierarchy in the contract negotiator system. One entry is required for each user-parent relationship within the hierarchy.

TABLE

User_Hierarchy

| Column Name | Key | Type | Size | Description |
|---|---|---|---|---|
| user_id | Y | CHAR | 10 | User ID (usually Social Security Number) |
| class1_user_id | Y | CHAR | 10 | Class1 User ID to which this user hierarchy is associated |
| effective_date | | DATE | | Effective date of hierarchy |
| expire_date | | DATE | | Expiration date of hierarchy |

The User_Login table includes User ID, password, and class information.

TABLE

User_Login

| Column Name | Key | Type | Size | Description |
|---|---|---|---|---|
| user_id | Y | CHAR | 10 | UserID (usually Social Security Number) |
| password | | VARCHAR | 15 | User's password. Defaulted to User ID. |
| class | | CHAR | 1 | Class of user |
| active_flag | | CHAR | 1 | Active/Deactivated flag. Default is 'T' (true). |

The Branch table includes branch information for a given branch ID.

TABLE

Branch

| Column Name | Key | Type | Size | Description |
|---|---|---|---|---|
| branch_id | Y | INTEGER | | Branch ID |
| branch_name | | VARCHAR | 15 | Branch description/name |

The Channel table includes channel information for a given channel ID, where "channel" denotes.

TABLE

Channel

| Column Name | Key | Type | Size | Description |
|---|---|---|---|---|
| channel_id | Y | INTEGER | | Channel ID |
| channel_name | | VARCHAR | 15 | Channel description/name |

The Region table includes region information for a given region ID, where "region" denotes a specific geographical or marketing region.

TABLE

Region

| Column Name | Key | Type | Size | Description |
|---|---|---|---|---|
| region_id | Y | INTEGER | | Region ID |
| region_name | | VARCHAR | 15 | Region description/name |

The Titles table includes titles for a given class.

TABLE

Titles

| Column Name | Key | Type | Size | Description |
|---|---|---|---|---|
| title | Y | VARCHAR | 30 | title |
| class | | CHAR | 1 | class number |

TABLE

Contract_Status

| Column Name | Key | Type | Size | Description |
|---|---|---|---|---|
| contract_number | Y | CHAR | 6 | Contract Number |
| contract_version | Y | CHAR | 2 | Contract Version (00–99) |
| user_id | Y | CHAR | 10 | User ID (usually Social Security Number) |
| status_cd | Y | CHAR | 5 | Contract Status |
| contract_type | Y | CHAR | 4 | Type of contract. |
| contract_sub_type | | CHAR | 4 | Sub type of contract |
| modify_date | | DATE | | The date of the new contract status |

The contract tables are a Contract_Status table, a Class_Permission table, a Status_Chg table, a Status table, a Contract_Admin table, a Clarifi_Comments table, a Component table, a Contract_Customer table, a Contract_Tree table, a Std_Comp_Tree table, a Support_Team table, a Contract_Type table, a Contract_Sub_Type table, a Hierarchy_Rule table, and an Access_Permission table.

The Contract_Status table tracks each status change to the contract, along with the User ID of the person who made the change. Status changes coordinate the workflow progressions through the contract process.

TABLE-continued

Contract_Status

| Column Name | Key | Type | Size | Description |
|---|---|---|---|---|
| pre_status_cd | Y | CHAR | 5 | Previous status of the contract |
| qc_flag | | CHAR | 1 | Flag to indicate a quick close contract |
| last_ct_chged | | DATETIME | | Last changed date and time for a contract |

The Class_Permission table regulates access to contracts based on contract status and user class.

TABLE

Class_Permission

| Column Name | Key | Type | Size | Description |
|---|---|---|---|---|
| status_cd | Y | CHAR | 5 | Contract status |
| class | | CHAR | | Class of user |
| access_mode | | CHAR | 1 | Allowed access mode (read, write, comment) |
| contract_creator | | CHAR | 1 | Access modes for a contract creator |

The Status_Chg table tracks the next allowable contract statuses depending on the current contract status. Valid status codes and status text are defined by the Status table.

TABLE

Status_Chg

| Column Name | Key | Type | Size | Description |
|---|---|---|---|---|
| status_cd | Y | CHAR | 5 | Status code |
| user_class | | CHAR | 1 | User class |
| allowable_status | | VARCHAR | 50 | Codes of next allowable statuses |

The Status table is used to define the text for each status value in Contract_Status.

TABLE

Status

| Column Name | Key | Type | Size | Description |
|---|---|---|---|---|
| status_cd | Y | CHAR | 5 | Status ID |
| status_type | | VARCHAR | 5 | Status Type |
| description | | VARCHAR | 25 | Description of the status |

Access restrictions to the contract database are dependent on user class and contract status. The following table shows the default access rights each class of user has for each status available in a contract. Actual user access may be further limited on a user-by-user basis in the user's profile, which is managed by a Class 6 user.

Contract Statuses

| Status | Class 1 | Class 2 | Class 3 | Class 4 | Class 5 |
|---|---|---|---|---|---|
| Incomplete | W | C | C | N | N |
| Submitted | C | C | C | C | N |

-continued

Contract Statuses

| Status | Class 1 | Class 2 | Class 3 | Class 4 | Class 5 |
|---|---|---|---|---|---|
| BD In Progress | C | C | C | W | C |
| Return for Rework | W | C | C | C | C |
| Approved with Changes | C | C | C | C | C |
| Approved | C | C | C | C | C |
| Canceled | C | C | C | C | C |
| Request Executable | C | C | C | C | C |
| Legal In Progress | C | C | C | C | W |
| Legal Returned | C | C | C | C | C |
| Legal Complete | C | C | C | C | C |
| Void | R | R | R | R | R |
| External | C | W' | C | W' | C |
| Signed-External | R | W' | R | W' | R |
| Executable | C | C | C | C' | C |
| Issued | C | C | C | C' | C |

C - Comment Access
C' - Comment Access, but the status can be changed by a Class 4 user to "BD In Progress", in which the Class 4 user has Write/Update Access capabilities.
N - No Access
R - Read Only Access
W - Write/Update Access
W' - Write/Update Access - limited to the following functions: Class 2 and Class 4 users may update the status to Signed-External after the contract is taken external and signed by the customer. Class 2 and Class 4 users may also update the pricing templates to "true up" the terms of the contract held in the system with the final signed external copy.

When first initiated by a Class 1 user, the contract has an "Incomplete" status. When the Class 1 user submits the contract into the system for approval by a Class 4 user, the status is changed to "Submitted" and the contract is distributed to all users, subject to class and status access restrictions (e.g., Class 5 users do not review the contract until a Class 4 user changes the contract status to a "Legal In Progress"). A Class 4 user (also called a Business Development (BD) Analyst) may change the status to "BD In Progress" and make modifications, clarifications, and comments to the contract. If a Class 4 user changes the contract status to "Return for Rework", the contract is available for the Class 1 user to modify as necessary.

A Class 4 user may also change the status to either "Approved" or "Approved with Changes." The status "Approved" indicates that the Class 4 user approved the contract without changing terms therein. (Examples of such terms include contract terms made available for modification in the "Pricing" template.) Alternately, the status "Approved with Changes" indicates that the Class 4 user modified terms within the contract. After either type of approval, the contract is routed to the Class 1 user for review. The Class 1 user may then request that an executable contract be generated by changing the status to "Request Executable", which causes the contract to be routed back to the Class 4 user. In an exemplary embodiment of the present invention, the Class 4 user may change the status to "Legal In Progress" to submit the contract to the legal department. By changing the status to "External", Class 5 user may "take the contract external" of the system, which involves printing a summary of contract terms. The external summary may be used by a Class 5 user to generate a hard-copy contract, which may be signed by the parties. When the external contract is signed, the status is changed to "Signed-External."

In another exemplary embodiment of the present invention, when the Class 1 user requests an executable, the Class 4 user may change the status to "Legal in Progress", which will route the document to a Class 5 user for possible modifications to the legal text. The Class 5 user does not, however, have write access authority to change contract pricing or duration terms. A Class 5 user may change the contract status to "Legal Returned" to require additional rework by the Class 1 or Class 4 user. Alternately, a Class 5 user may change the contract status to "Legal Complete", which is effectively an approval by the legal department. If, after a "Request Executable" status, no legal text modifications are required, the Class 4 user may change the status to "Executable." From this status, an executable copy may be printed by a Class 1 user for execution by the parties. Such printing results in an "Issued" status.

A new contract version is initiated if, after submission by a Class 1 user, any non-comment changes are made to the contract components and the contract is approved. When a new version is generated, the status of the previous version is automatically set to "Void." A "Canceled" status terminates the progression of the contract through the contract flow, but leaves the contract in the contract database for archival purposes. A Class 2 or Class 4 user may also change the status to "Void" to indicate that the contract was made executable but was not signed by the customer. The "Void" contract remains in the contract database for archival purposes.

The Contract_Admin table assigns a unique contract number to each new contract. There is only one row in this table, which is accessed with a lock to prevent other Class 6 users from accessing the table simultaneously.

TABLE

Contract_Admin

| Column Name | Key | Type | Size | Description |
|---|---|---|---|---|
| next_contract_no | | CHAR | 6 | Next Avail Contract Number |

The Clarifi_Comments table defines clarifications and comments associated with a specific contract or a specific clause in any specific contract.

TABLE

Clarifi_Comments

| Column Name | Key | Type | Size | Description |
|---|---|---|---|---|
| contract_number | Y | CHAR | 6 | Contract Number |
| contract_version | Y | CHAR | 2 | Contract Version (00–99) |

TABLE-continued

Clarifi_Comments

| Column Name | Key | Type | Size | Description |
|---|---|---|---|---|
| component_id | Y | INTEGER | | Component ID |
| user_id | | CHAR | 10 | User ID (usually SSN) who created the comment |
| comment_datetime | | DATETIME | | The date and time that the comment was created |
| comment_type | | VARCHAR | 5 | Type of comment |
| comment_text | | TEXT | | Text of the comment |

The Component table stores the individual contract components.

TABLE

Component

| Column Name | Key | Type | Size | Description |
|---|---|---|---|---|
| component_id | Y | INTEGER | | Component ID |
| component_desc | | VARCHAR | 32 | Component description |
| component_type_ver | Y | INTEGER | | Version of component |
| component_type_cd | Y | INTEGER | | Type of component |

The Contract_Customer table records information pertaining to the customer involved in the contract.

TABLE

Contract_Customer

| Column Name | Key | Type | Size | Description |
|---|---|---|---|---|
| contract_number | Y | CHAR | 6 | Contract Number |
| contract_version | Y | CHAR | 2 | Contract Version (00–99) |
| company_name | | VARCHAR | 40 | Company Name |
| nasp_id | | VARCHAR | 8 | NASP ID |
| contact_name | | VARCHAR | 30 | Contact Name |
| address1 | | VARCHAR | 50 | Address field |
| address2 | | VARCHAR | 50 | Additional address field |
| city | | VARCHAR | 25 | City |
| region | | VARCHAR | 15 | State or region |
| postal_cd | | VARCHAR | 9 | postal code |
| country | | VARCHAR | 25 | Country |
| phone | | VARCHAR | 20 | Phone number |
| fax | | VARCHAR | 20 | Fax number |

The Contract_Tree table stores contract components for specific contracts, which are configured as a tree of tables.

TABLE

Contract_Tree

| Column Name | Key | Type | Size | Description |
|---|---|---|---|---|
| contract_number | Y | CHAR | 6 | Contract Number |
| contract_version | Y | CHAR | 2 | Contract Version (00–99) |
| component_id | Y | INTEGER | | Component ID |
| parent_comp_id | | INTEGER | | Parent item component ID |
| hide_component | | CHAR | 1 | Flag indicating if component should be hidden. Default is for "FALSE." |
| position_id | | SMALLINT | | Position of child under its parent |
| complete_flag | | CHAR | 1 | Flag for completed component |
| optional_flag | | CHAR | 1 | Flag for optional component |
| included_flag | | CHAR | 1 | Flag for included component |
| component_type_ver | | INTEGER | | Component_type_version |
| contract_order | | INTEGER | | Order of component within a contract |

The Std_Comp_Tree table stores the base or default components that are used to build contract trees. When a new contract tree is created, the necessary rows are copied from Std_Comp_Tree to Contract_Tree.

TABLE

Std_Comp_Tree

| Column Name | Key | Type | Size | Description |
|---|---|---|---|---|
| component_id | Y | INTEGER | | Component ID |
| contract_type | | CHAR | 4 | Contract Type |
| contract_sub_type | | CHAR | 4 | Contract Sub Type |
| contract_order | | INTEGER | | Component order of a contract |
| parent_comp_id | | INTEGER | | Parent item's component ID |
| hide_component | | CHAR | 1 | Flag that indicates if component should be hidden. Default is 'F'. |
| position_id | | INTEGER | | Position of child under its parent |
| complete_flag | | CHAR | 1 | Flag for completed component |
| optional_flag | | CHAR | | Flag for optional component |
| included_flag | | CHAR | 1 | Flag for included component |
| component_type_ver | | INTEGER | | Component_type_version |

The Support_Team table defines the various team members for a specific contract. One entry per team member is required for each contract.

TABLE

Support_Team

| Column Name | Key | Type | Size | Description |
|---|---|---|---|---|
| contract_number | Y | CHAR | 6 | Contract Number |
| contract_version | Y | CHAR | 2 | Contract Version (00–99) |
| user_id | Y | CHAR | 10 | User ID (usually Social Security Number) |
| hide_contract | | CHAR | 1 | Flag that indicates if contract should be hidden from user's menu. Default is 'F'. |
| is_hier_user | | CHAR | 1 | 'T' if user is part of hierarchy |

The Contract_Type table defines the various types of contracts available within the contract negotiator system.

TABLE

Contract_Type

| Column Name | Key | Type | Size | Description |
|---|---|---|---|---|
| contract_type | | CHAR | 4 | Contract Type |
| description | | VARCHAR | 50 | Description of a contract type |

The Contract_Sub_Type table defines the various sub-types for a Contract_Type table.

TABLE

Contract_Sub_Type

| Column Name | Key | Type | Size | Description |
|---|---|---|---|---|
| ct_parent_type | | CHAR | 4 | Parent contract type of a sub type |
| contract_sub_type | | CHAR | 4 | Contract Sub Type |
| description | | VARCHAR | 50 | Description of a contract sub type |

The Access_Permission table defines various access permissions for each user.

TABLE

Access_Permission

| Column Name | Key | Type | Size | Description |
|---|---|---|---|---|
| access_cd | Y | INTEGER | | Access code |
| access_desc | | VARCHAR | 75 | Access description |

The Hierarchy_Rule table defines the minimum and maximum number of people who may be hierarchy members for a particular contract at a particular class level.

TABLE

Hierarchy_Rule

| Column Name | Key | Type | Size | Description |
|---|---|---|---|---|
| class | | CHAR | 1 | Class number |
| req_users | | INTEGER | | Minimum number of class user |
| max_users | | INTEGER | | Maximum number of class user |

The support tables are a Countries table, a States table, a Component_Types table, a QC_Contract_Points table, a QC_Annual_Commit table, a QC_Local_Price_Val table, an Err_Messages table, a Transaction_Log table, and a Transaction table.

The Countries table is used to map countries and their countries codes.

TABLE

Countries

| Column Name | Key | Type | Size | Description |
|---|---|---|---|---|
| country_cd | Y | INTEGER | | Country code |
| country | | VARCHAR | 25 | Country name |
| component_type_cd | | INTEGER | | Component type code, that are using this country table |

The States table maps state abbreviations to state names.

TABLE

States

| Column Name | Key | Type | Size | Description |
|---|---|---|---|---|
| state_cd | Y | CHAR | 2 | State code |
| state_name | | VARCHAR | 15 | State name |

The Component_Type table describes each component type, and serves as a class engine for an application client.

TABLE

Component_Type

| Column Name | Key | Type | Size | Description |
|---|---|---|---|---|
| component_type_cd | Y | INTEGER | | Unique component type code |
| component_type | | CHAR | 6 | Short name for each component |
| type_desc | | VARCHAR | 25 | Full description of each component |
| class_name | | VARCHAR | 35 | Java class name for each component |
| quick_close | | CHAR | 1 | Flag to indicate quick close component. Default is 'F' |

The QC_Contract_Points table stores contract points for a contract that has a Quick Close component.

TABLE

QC_Contract_Points

| Column Name | Key | Type | Size | Description |
|---|---|---|---|---|
| contract_number | Y | CHAR | 6 | Contract number |
| contract_version | Y | CHAR | 2 | Contract version |
| pts_avail | | INTEGER | | Available points for a contract |
| pts_used | | INTEGER | | Used points for a contract |
| annual_commit | | VARCHAR | 8 | Annual commit values for a contract |
| year | | INTEGER | | Term period of a commitment |

The QC Annual_Commit table stores point matrices for the various Quick Close type contracts.

TABLE

QC_Annual_Commit

| Column Name | Key | Type | Size | Description |
|---|---|---|---|---|
| component_type_cd | Y | INTEGER | | Component Type Code |
| annual_commitment | | VARCHAR | 8 | Annual commitment values |
| year | | INTEGER | | Term period of a commitment |
| points | | INTEGER | | Points for a component |

The QC Local_Price_Val table stores point matrices corresponding to the Quick Close local price template.

TABLE

QC_Local_Price_Val

| Column Name | Key | Type | Size | Description |
|---|---|---|---|---|
| discount | | INTEGER | | Discount value |
| term | | INTEGER | | Term period of commitment |
| std_sdyr | | CHAR | 1 | standard discount or not |
| points | | INTEGER | | Points for a component |

The Error_Messages table stores applications specific error messages.

TABLE

Error_Messages

| Column Name | Key | Type | Size | Description |
|---|---|---|---|---|
| error_cd | Y | INTEGER | | Error number |
| error_desc | | VARCHAR | 50 | Description of error code |
| error_usage | | VARCHAR | 35 | Origin of an error message |

The Transaction_Log table tracks each transaction acted on in the contract, along with the User ID of the acting user, allowing a form of version tracking.

TABLE

Transaction_Log

| Column Name | Key | Type | Size | Description |
|---|---|---|---|---|
| contract_number | Y | CHAR | 6 | Contract Number |
| contract_version | Y | CHAR | 2 | Contract Version (00–99) |
| tranx_datetime | Y | DATETIME | | The date and time that the transaction occurred |
| user_id | Y | CHAR | 10 | User ID (usually SSN) who performed the transaction |
| current_status_cd | | INTEGER | | Contract Status Code |
| pre_status_cd | | INTEGER | | Previous Status Code |
| transaction_cd | | INTEGER | | Transaction Code |
| comments | | VARCHAR | 200 | Any comments on each transaction |

The Transaction table defines transaction log code and their associated description.

TABLE

Transaction

| Column Name | Key | Type | Size | Description |
|---|---|---|---|---|
| transaction_cd | Y | INTEGER | | Transaction code |
| tranx_description | | VARCHAR | 50 | Description of the transaction type |

The generic template tables are Respond_Free_Text, and Generic_Templates. The Respond_Free_Text table includes user responses to Q&A or the "BLOB" templates for specific contracts. BLOB stands for "Binary Loaded OBject.

TABLE

Respond_Free_Text

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id | Y | INTEGER | | Component ID |
| template_type_cd | | INTEGER | | Component Type Code |
| user_id | Y | CHAR | 10 | User ID (usually SSN) |
| change_datetime | | DATETIME | | Date and time of blob update |
| respond_free_text | | BLOB | | Blob |

The Generic_Template table includes Q&A and "BLOB" templates and clauses for each component. Each instance of the Generic_Template table is associated with a default Q&A or default "BLOB" item.

TABLE

Generic_Template

| Column Name | Key | Type | Size | Description |
|---|---|---|---|---|
| component_id | Y | INTEGER | | Component ID |
| default_free_text | | BLOB | | Question to ask user or blob template to be completed by the user |
| component_type_cd | | INTEGER | | Component Type Code |
| component_type_ver | | INTEGER | | Component Type Version |

The Quick Close tables are QC_Term_Conditions, QC_Credit, QC_Paging, QC_Cellular, QC_Local_Price, QC_Hype_Term, QC_Vmt, QC_Audio_Conf, QC_Access, QC_Dedic_Leased, and QC_Op_Provision.

The QC_Term_Conditions table stores information for Terms and Conditions Quick Close options.

TABLE

QC_Term_Conditions

| Column Name | Key | Type | Size | Description |
|---|---|---|---|---|
| contract_number | Y | CHAR | 6 | Contract Number (000001–000099) |
| contract_version | Y | CHAR | 2 | Version Number (00–99) |
| component_id |  | INTEGER |  | Component ID |
| divestiture |  | CHAR | 1 | Business divestiture flag |
| downturn |  | CHAR | 1 | Business downturn flag |
| q_a |  | CHAR | 1 | Quality Assurance flag |
| tech_change |  | CHAR | 1 | Technology change flag |
| chronic_service |  | CHAR |  | Chronic Service Level Agreement flag |
| std_util |  | CHAR | 1 | Reduction in standard utilization flag |
| early_term_penalty |  | CHAR | 1 | Reduction in early term penalties flag |
| ramp_month3 |  | CHAR | 1 | Ramp period of 3 months flag |
| ramp_month6 |  | CHAR | 1 | Ramp period of 6 months flag |
| ramp_month12 |  | CHAR | 1 | Ramp period of 12 months flag |
| emp_benefit |  | CHAR | 1 | Employee benefit program flag |
| comp_pts |  | INTEGER |  | Quick Close points for each component |

The QC_Credit table stores information for the Credits and Additional -Discount Quick Close Option.

TABLE

QC_Credit

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id |  | INTEGER |  | Component ID |
| inst_waiver |  | INTEGER |  | Installation waiver |
| cost_conversion |  | INTEGER |  | Cost of conversion bonus |
| cost_conv_opt |  | INTEGER |  | Invoice Credit/Deposit to Fund selection |
| comp_pts |  | INTEGER |  | Quick Close points for each component |

The QC_Paging table stores information for the NetworkMCI Paging Service Quick Close Option.

TABLE

QC_Paging

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id |  | INTEGER |  | Component ID |
| page_disc |  | INTEGER |  | Discount on paging usage |
| comp_pts |  | INTEGER |  | Quick Close points for each component |

The QC_Cellular table stores information for the NetworkMCI Cellular Service Quick Close Option.

TABLE

QC_Cellular

| Column Name | Key | Type | Size | Description |
|---|---|---|---|---|
| contract_number | Y | CHAR | 6 | Contract Number |
| contract_version | Y | CHAR | 2 | Version Number (00–99) |

TABLE-continued

QC_Cellular

| Column Name | Key | Type | Size | Description |
|---|---|---|---|---|
| component_id |  | INTEGER |  | Component ID |
| cellular_disc |  | INTEGER |  | Discount on cellular usage |
| comp_pts |  | INTEGER |  | Quick Close points for each component |

The QC_Local_Price table stores information about the Local Pricing Quick Close Option.

TABLE

QC_Local_Price

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id |  | INTEGER |  | Component ID |
| disc_percent1 |  | INTEGER |  | Local price discount |
| term1 |  | INTEGER |  | Term |

TABLE-continued

QC_Local_Price

| Column Name | Key | Type | Size | Description |
|---|---|---|---|---|
| std_dsyr1 | | CHAR | 1 | Standard discount or not |
| disc_points1 | | INTEGER | | Discount points |
| comp_pts | | INTEGER | | Quick Close points for each component |

The QC_Hype_Term table stores information for the Domestic Hyperstream Quick Close Option and Frame Relay Quick Close Option.

TABLE

QC_Hype_Term

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id | | INTEGER | | Component ID |
| additional_HPP | | CHAR | 1 | Additional discount about standard HPP |
| comp_pts | | INTEGER | | Quick Close points for each component |

The QC_Vmt table holds the information for VNET, MCI Toll Free Platform and NetworkMCI One Platform templates.

TABLE

QC_Vmt

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id | | INTEGER | | Component ID |
| interstate | | INTEGER | | Discount on interstate voice traffic |
| intrastate | | INTEGER | | Discount on intrastate voice traffic |
| international | | INTEGER | | Discount on international voice traffic |
| race_succ | | INTEGER | | Race to success promotion discount |
| international_outb | | VARCHAR | 20 | Postalize International Outbound Rates |
| rate_protection | | INTEGER | | Rate Protection |
| comp_pts | | INTEGER | | Quick Close points for each component |

The QC_Audio_Conf table stores information for the Audio Conferencing Quick Close Option.

TABLE

QC_Audio_Conf

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id | | INTEGER | | Component ID |
| audio_conf_disc | | INTEGER | | Discount on audio conferencing |
| comp_pts | | INTEGER | | Quick Close points for each component |

The QC_Access table stores information for the Access Quick Close Option.

TABLE

QC_Access

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id | | INTEGER | | Component ID |
| access_disc | | INTEGER | | Access discount |
| frame_relay_waive | | CHAR | 1 | Waive A/C for frame relay |
| comp_pts | | INTEGER | | Quick Close points for each component |

The QC_Dedic_Leased table stores information for the Dedicated Leased Line Quick Close Option.

TABLE

QC_Dedic_Leased

| Column Name | Key | Type | Size | Description |
|---|---|---|---|---|
| contract_number | Y | CHAR | 6 | Contract Number |
| contract_version | Y | CHAR | 2 | Version Number (00–99) |
| component_id | | INTEGER | | Component ID |
| NPP_level | | INTEGER | | NPP levels |
| NPP_flag | | CHAR | 1 | NPP flag |
| npp_disc | | INTEGER | | Discount value |
| term | | INTEGER | | Term period of commitment |
| commitment | | VARCHAR | 8 | Commitment |
| comp_pts | | INTEGER | | Quick Close points for each component |

The custom_screen_tables are CS_Index, CS_Data_Table_ID, CS_Char, CS_Integer, CS_Float, CS_Varchar, and CS_Blob.

The CS_Index table stores information for all tabs and screens associated with a contract component.

TABLE

CS_Index

| Column Name | Key | Type | Size | Description |
|---|---|---|---|---|
| component_id | Y | INTEGER | | Component ID |
| component_type_ver | Y | INTEGER | | Component Type Version |
| tab_id | | INTEGER | | Tab ID |
| tab_order | | INTEGER | | Order of a tab |
| screen_id | | INTEGER | | Screen ID |

The CS_Data_Table_ID table is a custom screen support table that stores information about custom screen data table descriptions associated with a specific data table ID.

TABLE

CS_Data_Table_ID

| Column Name | Key | Type | Size | Description |
|---|---|---|---|---|
| data_table_id | Y | INTEGER | | Data Table ID |
| table_desc | | VARCHAR | 25 | Table Description |

CS_Char table stores user response data for the character data type field.

TABLE

CS_Char

| Column Name | Key | Type | Size | Description |
|---|---|---|---|---|
| contract_number | Y | CHAR | 6 | Contract number |
| contract_version | Y | CHAR | 2 | Contract version |
| component_id | Y | INTEGER | | Component ID |
| component_type_ver | Y | INTEGER | | Component Type Version |
| field_id | Y | INTEGER | | Field ID |
| char_datafield | | CHAR | 75 | Character data type data |

The CS_Integer table stores user response data for the integer data type field.

TABLE

CS_Integer

| Column Name | Key | Type | Size | Description |
|---|---|---|---|---|
| contract_number | Y | CHAR | 6 | Contract number |
| contract_version | Y | CHAR | 2 | Contract version |
| component_id | Y | INTEGER | | Component ID |
| component_type_ver | Y | INTEGER | | Component Type Version |
| field_id | Y | INTEGER | | Field ID |
| int_datafield | | INTEGER | | Integer data type data |

The CS_Float table stores user response data for the float data type field (i.e., floating point).

TABLE

CS_Float

| Column Name | Key | Type | Size | Description |
|---|---|---|---|---|
| contract_number | Y | CHAR | 6 | Contract number |
| contract_version | Y | CHAR | 2 | Contract version |
| component_id | Y | INTEGER | | Component ID |
| component_type_ver | Y | INTEGER | | Component Type Version |
| field_id | Y | INTEGER | | Field ID |
| float_datafield | | FLOAT | | Float data type data |

The CS_Varchar table stores user response data for the varchar data type field, a variable length character data type.

TABLE

CS_Varchar

| Column Name | Key | Type | Size | Description |
|---|---|---|---|---|
| contract_number | Y | CHAR | 6 | Contract number |
| contract_version | Y | CHAR | 2 | Contract version |
| component_id | Y | INTEGER | | Component ID |
| component_type_ver | Y | INTEGER | | Component Type Version |
| field_id | Y | INTEGER | | Field ID |
| vc_datafield | | VARCHAR | 100 | Varchar data type data |

The CS_Blob table stores user response data for the text data type field.

TABLE

CS_Blob

| Column Name | Key | Type | Size | Description |
|---|---|---|---|---|
| contract_number | Y | CHAR | 6 | Contract number |
| contract_version | Y | CHAR | 2 | Contract version |
| component_id | Y | INTEGER | | Component ID |
| component_type_ver | Y | INTEGER | | Component Type Version |
| field_id | Y | INTEGER | | Field ID |
| blob_datafield | | TEXT | | Blob data type data |

The Custom_Screen tables are useful for new contract generation and new Custom_Screen development. These generic templates, associated with a data type, are used to store user response data from custom screens. For example, a new Custom_Screen may be developed for defining discounts based on a list of numbered regions. The screen developer may use a CS_Integer table to store the numbered region value and a CS_Float table to store the discount percentage input by the user. The generic table is selected by the developer according to data type and includes fields for corresponding to the individual data type instance with the appropriate contract and contract component. As such, these custom screen tables provide a set of generic data type tables to standardize and expedite custom screen development.

Figure 6:
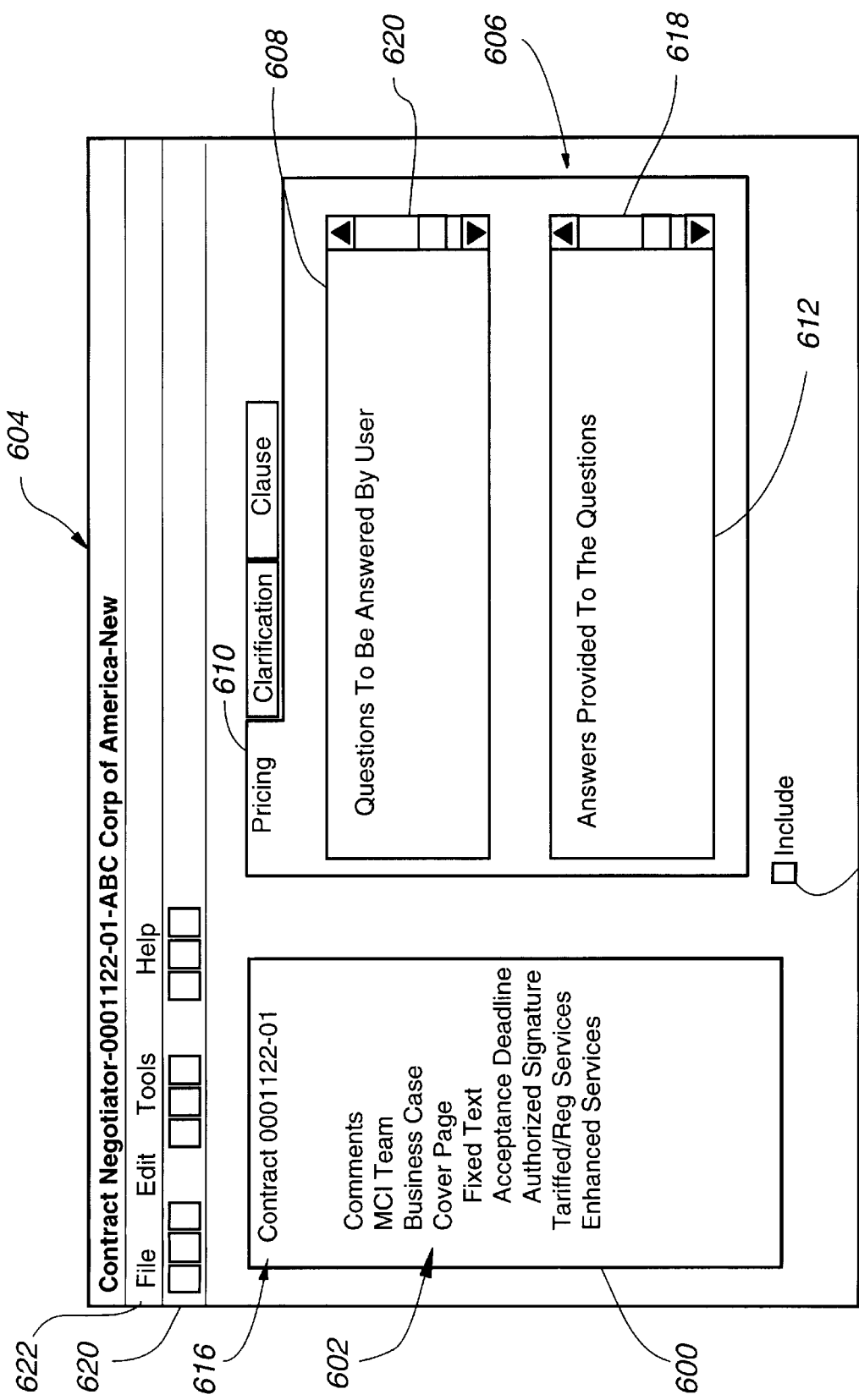
FIG. 6 illustrates a Q&A generic template screen with the Pricing tab selected.

FIG. 6 depicts a contract negotiator user screen for an exemplary contract in accordance with the present invention. The particular screen illustrated is a Question and Answer generic template (Q&A). Left window 600 comprises text identifying the associated contract, as identified by the contract number 616 (i.e., "0001122-01"). Most user screens within a contract negotiator system support a button bar and/or a menu to provide a user with functionality within the system. The button bar 620 and menu 622 of a preferred embodiment in accordance with the present invention is context sensitive. Left window 600 also comprises a tree view of the contract (shown generally at 602). Contract tree 602 initially shows only the base levels of the contract tree; however, the tree view may be expanded to display the detailed components of the contract. When a detailed component is selected in the left window, the right side of the contract negotiator screen will present a work area 606 having a notebook for data entry.

Colors and other visual markings are used to indicate the various characteristics of contract components. Such characteristics include whether a component is included in the contract, whether the component is complete/incomplete, and whether a component is in error. Contract components in a tree are colored in green and preceded by a check mark if they are included in the contract and have no system-verifiable problems outstanding. Red is used, with a preceding "X", to show those contract components that are incomplete or in error. Contract components that are not included in the contract are black. The contract number, contract version number, customer name, and status are displayed in the title bar 604 at all times. In FIG. 6, the contract version number is indicated by the suffix following the dash (i.e., "01").

A system in accordance with the present invention supports a Q&A generic template as a notebook presented in the work area (shown generally at 506). Three tabs are positioned at the top of the notebook: "Pricing," "Clarification," and "Clause." Pricing tab 610 corresponds to a notebook comprising top list box 608 and bottom edit box 612. Top list box 608 includes questions populated with the contents of RTF (Rich Text Format) text that prompt the user to enter contract-specific information. The text entered in top list box 608 is originally input by a Class 6 user preparing the contract tree, and all other class users have read-only access to the top list box. Bottom edit box 612 is editable and allows a user to respond to the questions in top list box 608 by inserting text into bottom edit box 612. "Include" check box 614 allows a user to indicate whether an optional contract component is to be included in the contract. When "include" check box 614 is checked, the associated contract component or clause is included in the contract. If the information displayed in either top list box 608 or bottom edit box 612 exceeds the visible work area, scroll bars 618 and 620 are available to allow a user to scroll beyond the initially displayed area.

Figure 7:
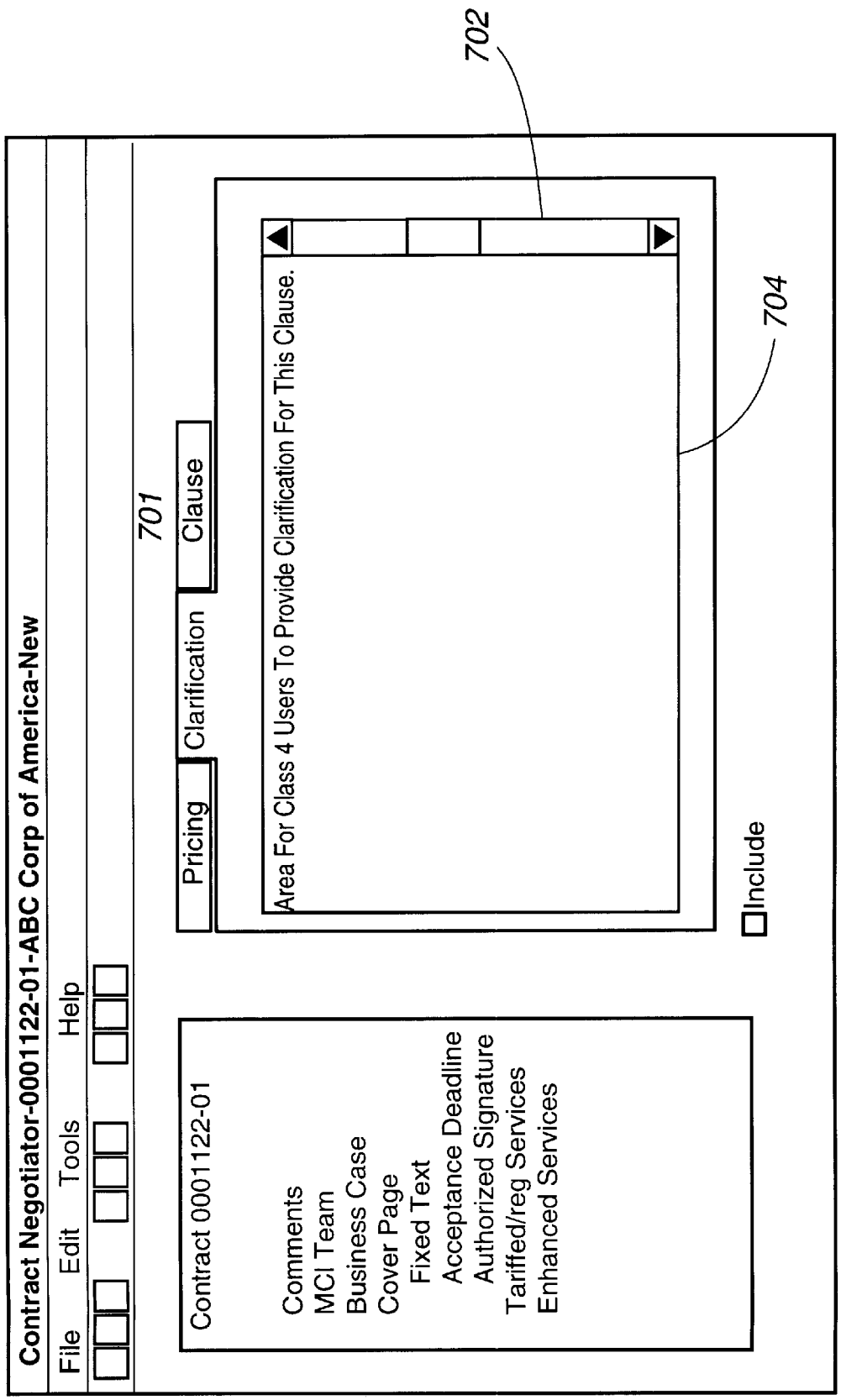
FIG. 7 illustrates a Q&A generic template screen with the Clarification tab selected.

FIG. 7 illustrates the Clarification tab 701 of a Q&A work area. All classes of users have access to view the contents of Clarification tab 701, but only Class 4 users are able to modify information contained therein. If the information entered exceeds the visible work area, scroll bar 702 is available to allow a user to scroll beyond the initially displayed area. Text entered by a Class 4 user in a clarification edit box 704 is viewable by other users within the contract negotiator system and are printed out with a contract summary with an embodiment of the invention illustrated in FIGS. 4C and 4D.

Figure 8:
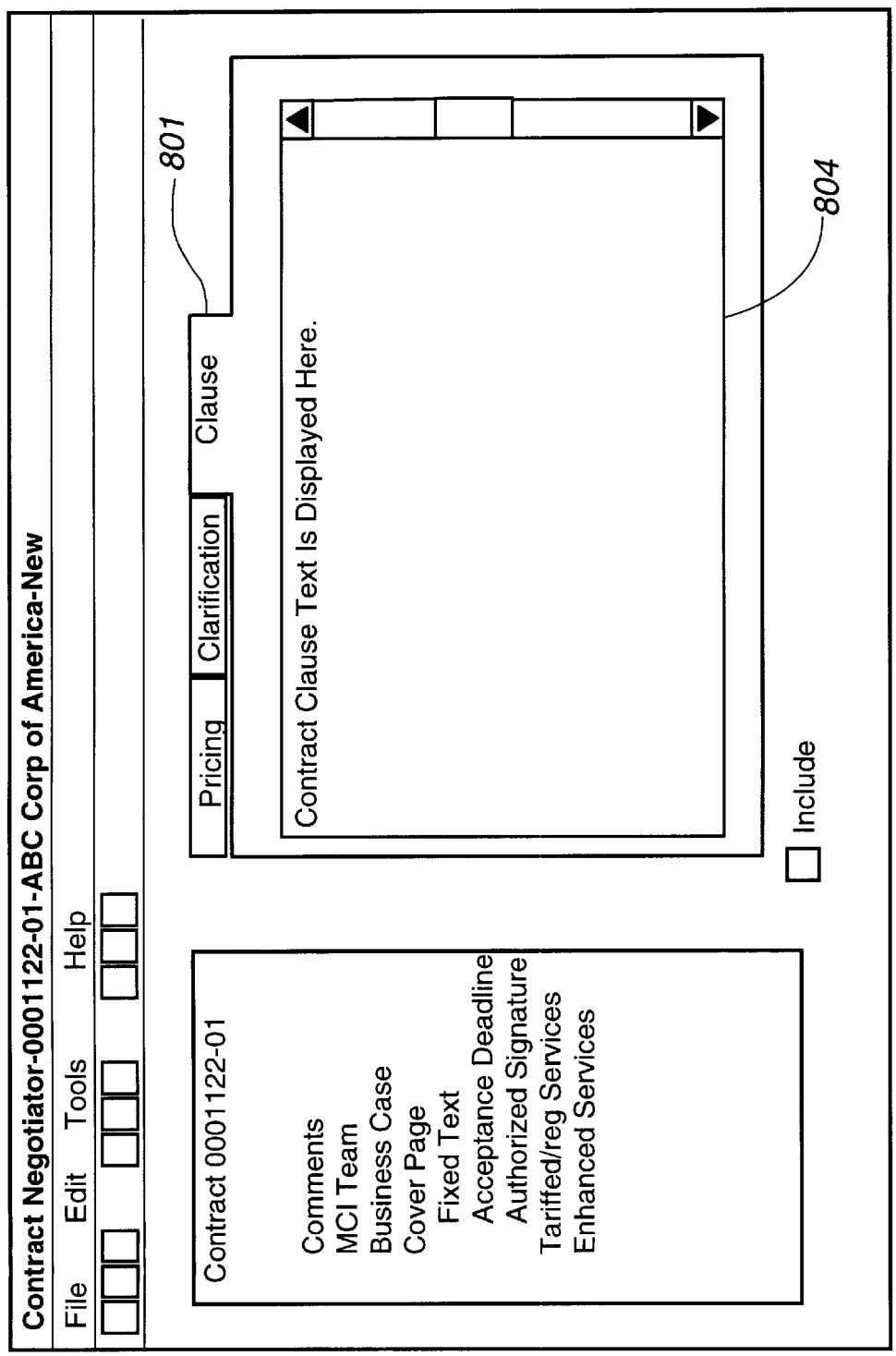
FIG. 8 illustrates a Q&A generic template screen with the Clause tab selected.

FIG. 8 illustrates the Clause tab 801 of a Q&A work area. The Clause tab includes standard legal text for the contract component in text box 804. The text is read-only and cannot be modified by Class 1–5 users. A Class 6 user enters the standard legal text by editing the contract baselines, discussed later.

Figure 9:
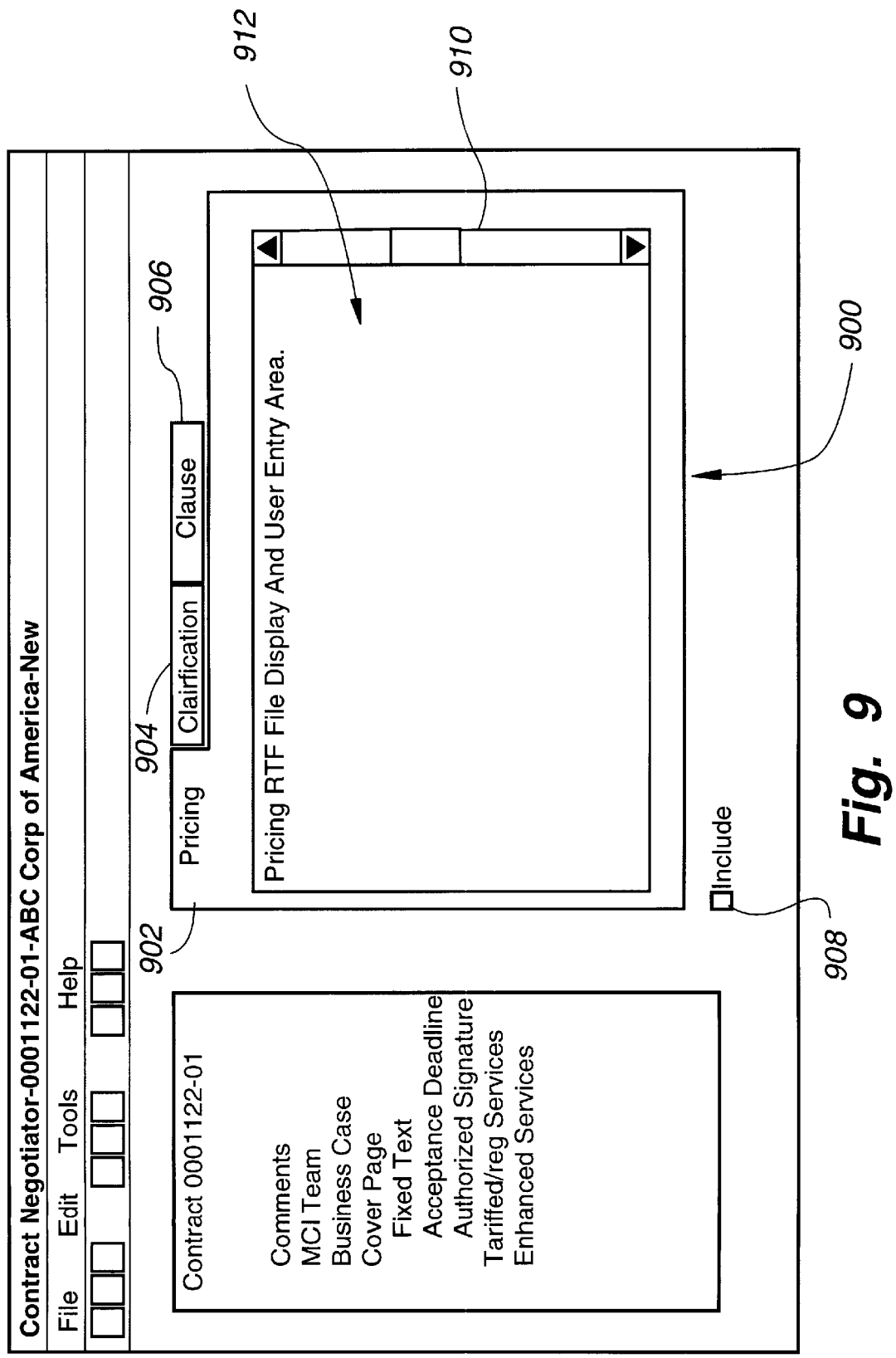
FIG. 9 illustrates a BLOB generic template screen with the Pricing tab selected.

FIG. 9 illustrates a BLOB generic template in a notebook presented in the work area (shown generally at 900). Three tabs are presented at the top of the notebook: Pricing, Clarification, and Clause. With regard to the BLOB generic template, Pricing tab 902 has an edit area 912 that will be initially populated with the contents of an RTF text that prompts the user to enter contract-specific information. The authorized user may edit the RTF text with appropriate responses or partially or completely modify the text therein. Clarification tab 904 and Clause tab 906 are equivalent to the corresponding tabs in the Q&A generic template. "Include" check box 908 is also equivalent to the include check box in Q&A in the generic template. If the information displayed in edit area 912 exceeds the visible work area, a scroll bar 910 is available to allow a user to scroll beyond the initially displayed area.

Figure 10:
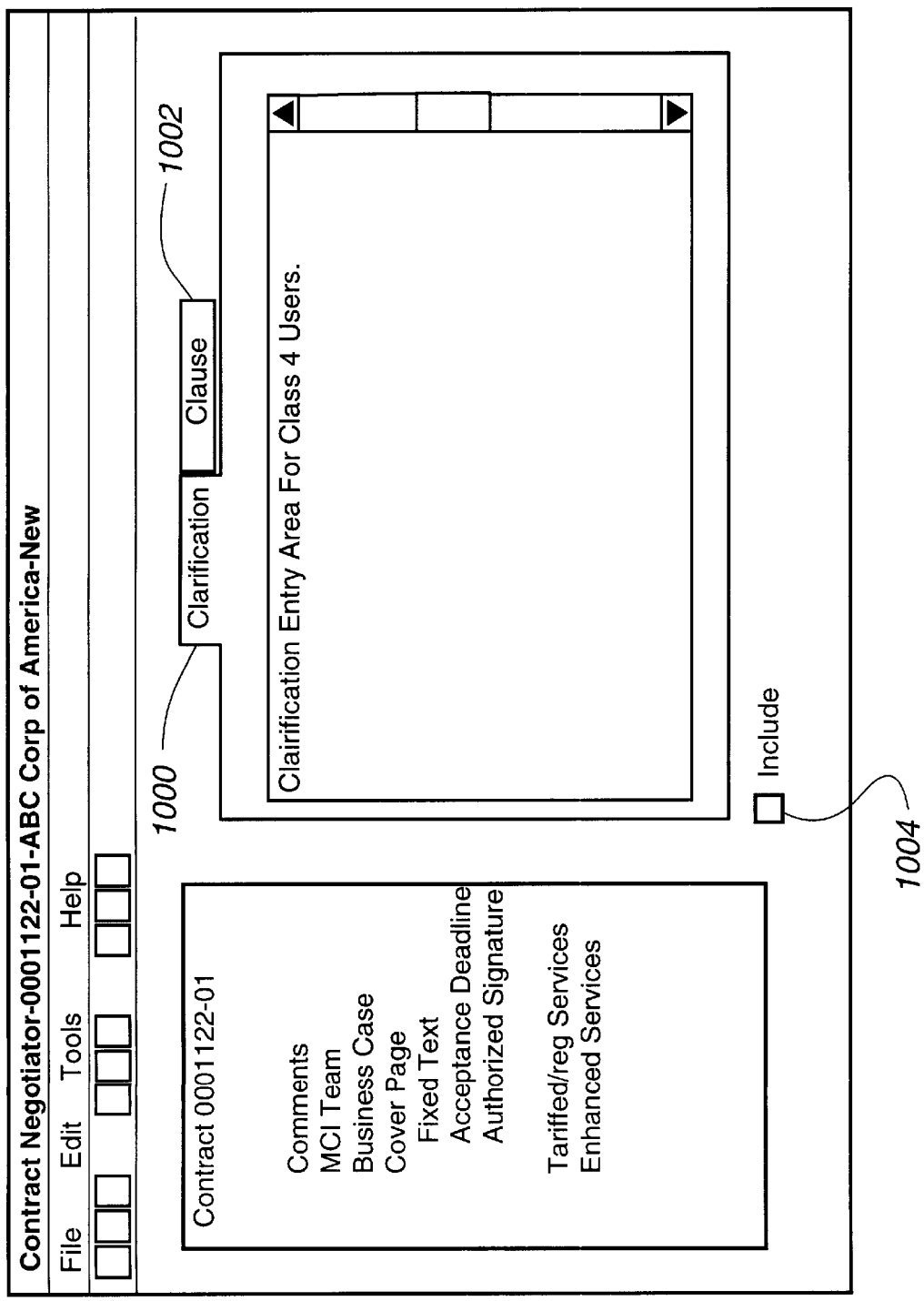
FIG. 10 illustrates a No Pricing generic template screen with the Clarification tab selected.

In FIG. 10, a "No Pricing" template is illustrated. This template corresponds to contract elements that lack pricing components. Class 4 users may enter clarifications, and all users may view the clarifications 1000 and clause 1002 text, as described for the Q&A template and the BLOB template. In an embodiment of the present invention, the clarifications may be output from the system in a contract summary. The "include" check box 1004 operates as previously described.

Figure 11:
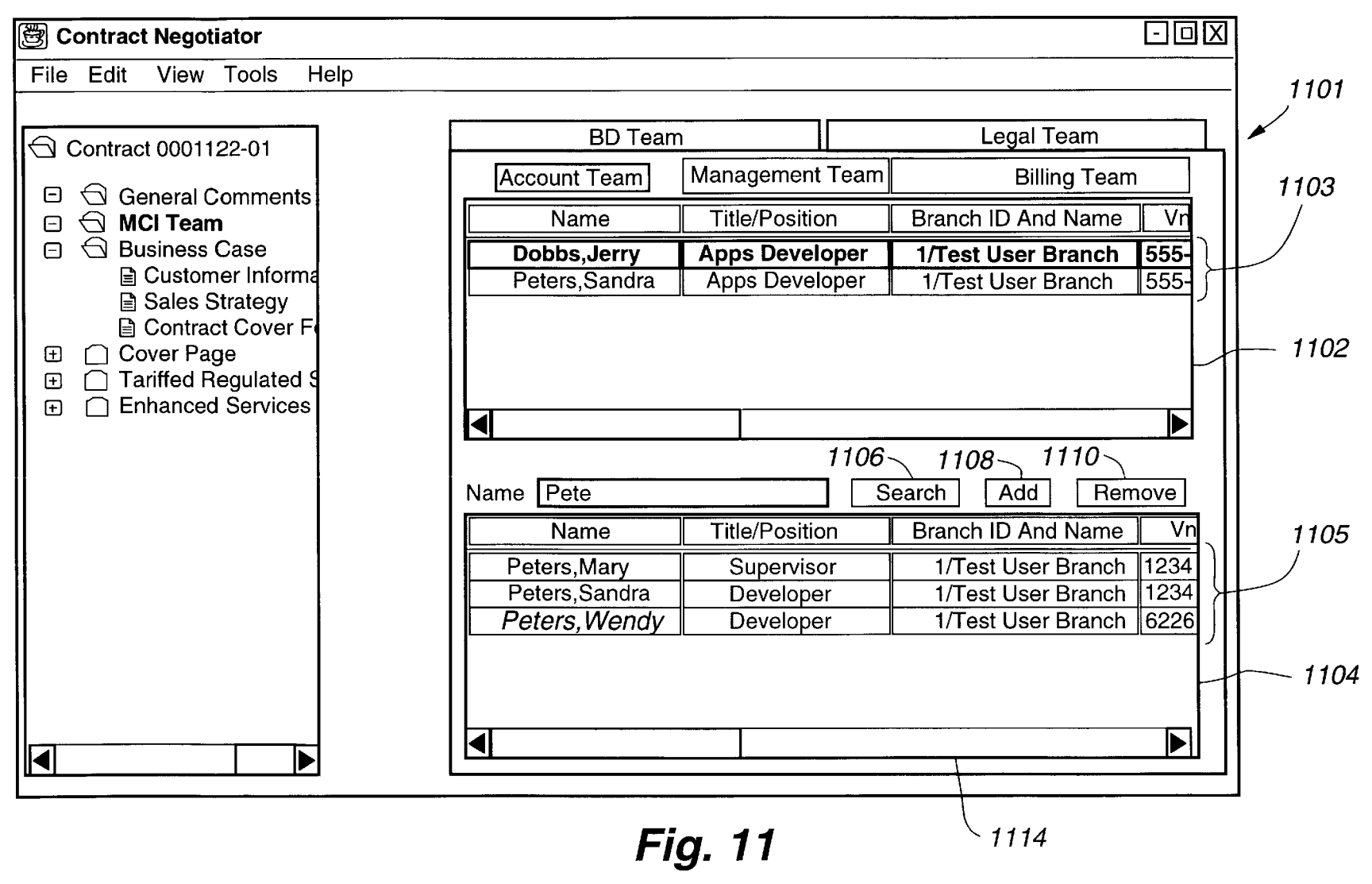

FIG. 11 depicts a Team Screen used to search, add, and remove users from the list of team members responsible for a contract. The work area shown includes five tabs at 1101 corresponding to the first five class levels in the contract hierarchy. When a Class 1 user initiates a contract, the permanent hierarchy assigned to the Class 1 user is automatically assigned to the contract. Members of this hierarchy may not be removed, except by a Class 6 (administration) user. Other members of the team, however, may be added and removed as desired by team members at any class level (i.e., these other users are non-permanent). After the Class 1 user submits the contract, it is electronically distributed to all team members and presented to each team member when they log on to the system.

Upper box 1102 lists users assigned to the contract team. Lower box 1104 depicts additional users corresponding to the displayed class available to be added to the contract team if desired. If the list of names displayed in either upper box 1102 or lower box 1104 exceeds the visible work area, vertical scroll bars (not shown) are available to allow a user to scroll beyond the initially displayed area. Furthermore, if the list elements extend horizontally to exceed the visible work area, horizontal scroll bar 1114 is available to allow a user to scroll horizontally beyond the initially displayed area. To add a new team member, a user selects the name of a person to be added from list 1105 and selects the "Add" button 1108. The selected user's name is then added to team list 1103, and the contract will be distributed to that person as appropriate. To search for an available team member in list 1105, a user enters the partial or complete name of a person to be searched in the "Name box 112" and presses the search button 1106. If the name of the person searched is found, the list 11 05 is scrolled to display the located name within the visible work area. To remove a non-permanent member of the contract team, a user selects the member's entry in the team list 1103 and selects remove button 1110. The team member name is then deleted from list 1103, and the contract will no longer be routed to that user. Members of a Class 1 user's permanent hierarchy cannot be removed from the contract team in this manner.

Figure 12:
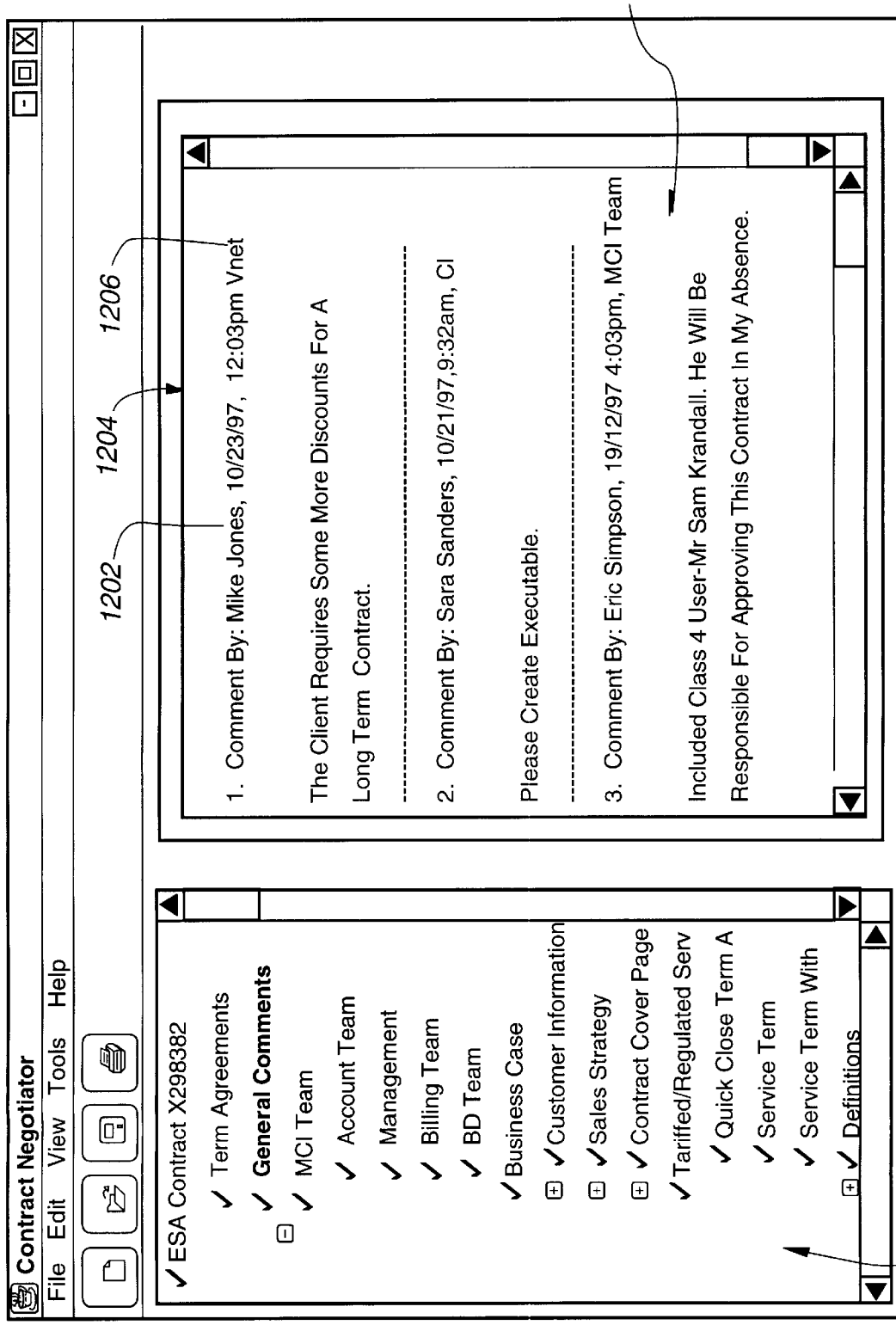
FIG. 12 illustrates a comment view screen in accordance with the present invention.

FIG. 12 shows a comment view screen that displays all the comments made regarding the contract, listed by date/time in ascending order. The name of the user who entered the comment (1202), the date and time of the comment entry (1204), and the section of the contract (1206) in which the user was working when the comment was entered are displayed with the comment text in work area 1200. As shown generally at 1208, the contract tree includes a contract component labeled "General Comments", which a user may select to display the comment work area.

The term "Quick Close" refers to a special type of contract that enables an expedited approval process by negotiating terms that meet certain defined business parameters. Some components of a contract that represent the services offered are designed to have Quick Close options. When these contract components are selected and completed within the defined business parameters, an expedited time frame for approval is guaranteed within the business organization. This guarantee is in accordance with the business organization's policies, and a system in accordance with the present invention enables automation of such policies. When a contract component associated with a Quick Close option is selected by a user, one of several possible Quick Close screens is displayed. By selecting from those services with Quick Close options and allocating no more than a maximum number of points available, based on the contract term and the minimum annual commitment of a customer, there is a commitment by the business organization to expedite processing the contract to approval.

Figure 13:
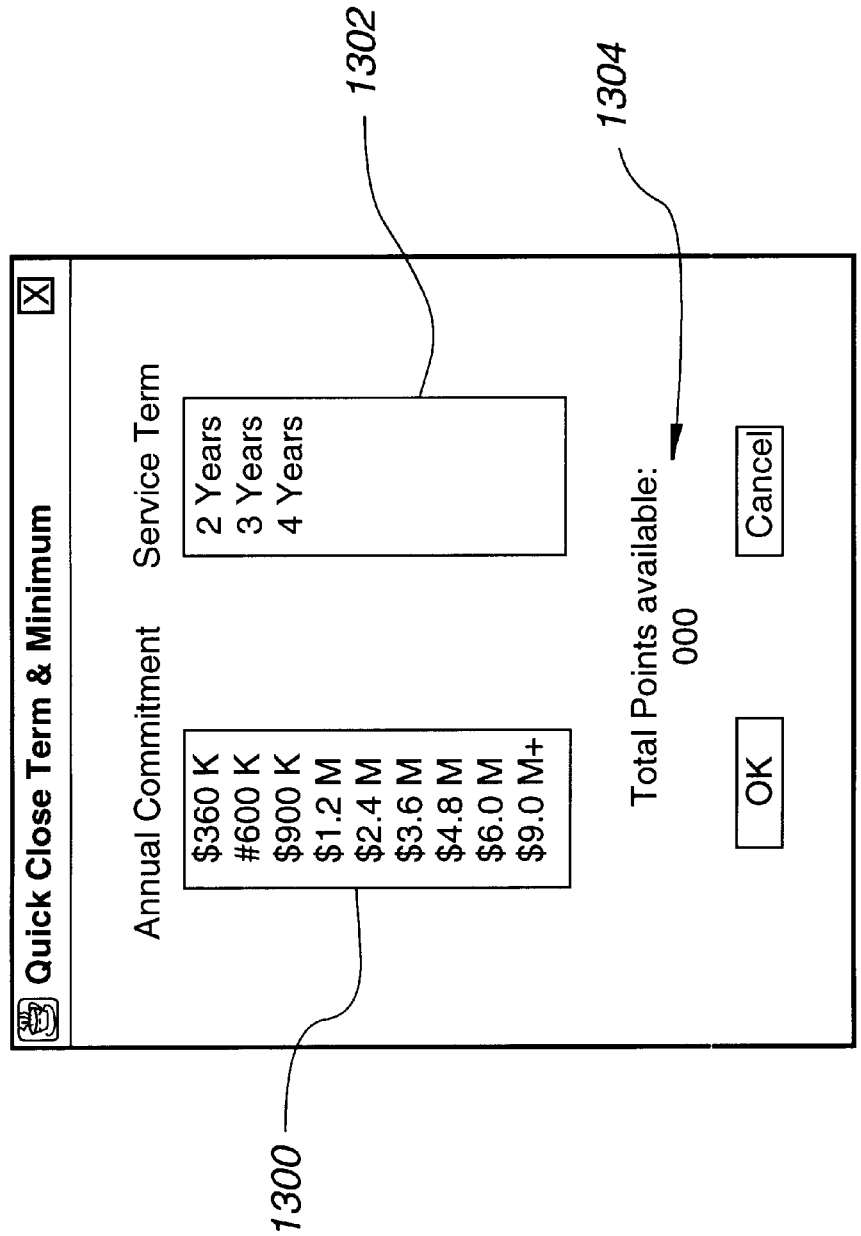
FIG. 13 illustrates a Quick Close Terms and Conditions screen in accordance with the present invention.

The Quick Close point maximum (i.e., total available points) is controlled by the terms and conditions screen illustrated in FIG. 13. A user selects an annual minimum commitment (i.e., the minimum number of dollars that a customer commits to spend annually) from list box 1300. Each combination of commitment value and contract duration (i.e., contract term in box 1302) is allocated a certain number of points. In a preferred embodiment, the available points are determined from a 2-dimensional data grid provided by a business department within the organization, with commitment values and contract duration being the two dimensions. The resulting value represents the total points available for allocation among Quick Close components and is displayed generally at 1304. The total available points value 1304 is stored in the central repository (i.e., the contract database) and allocated as the user selects and manipulates various contract component options associated with the current contract.

Figure 14:
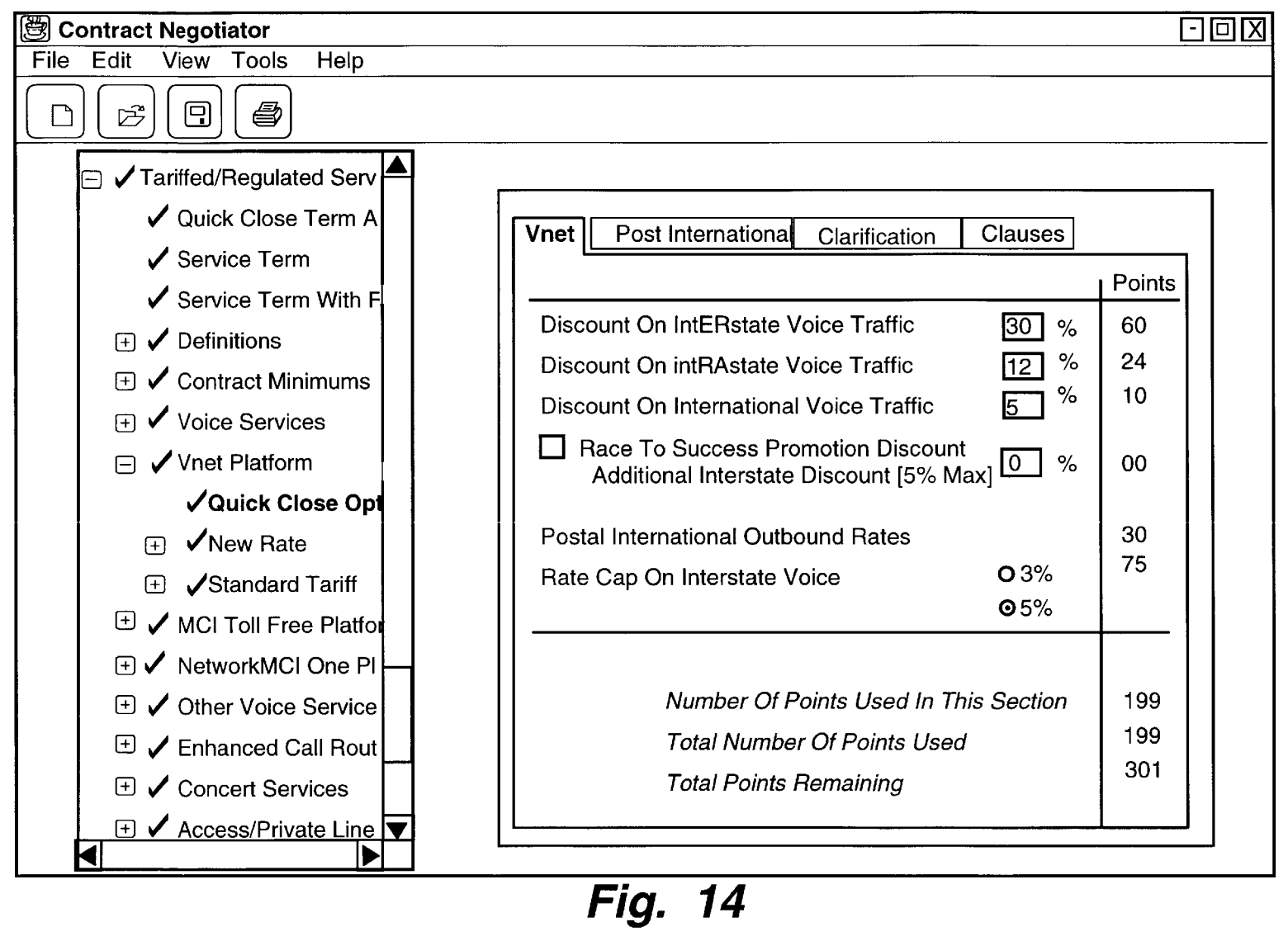

FIG. 14 shows a screen for an exemplary Quick Close contract component. In work area 1400, a user may enter discount percentage values in the boxes shown at 1402. Each discount corresponds to a point allocation shown in column 1404. For example, the greater the interstate voice traffic discount, the greater the points allocated to that discount. Likewise, the relationship between a Quick Close option value and the allocated points may also be inverse. For example, the higher the rate cap on interstate voice, the lower the point value allocated to that option. The system automatically sums the number of points allocated in the displayed section, shown at 1406. The total number of points allocated throughout the contract are displayed at 1408. The total points remaining available for allocation, based on the total points available value (shown generally at 1304 in FIG. 13), are shown at 1410.

Figure 15:
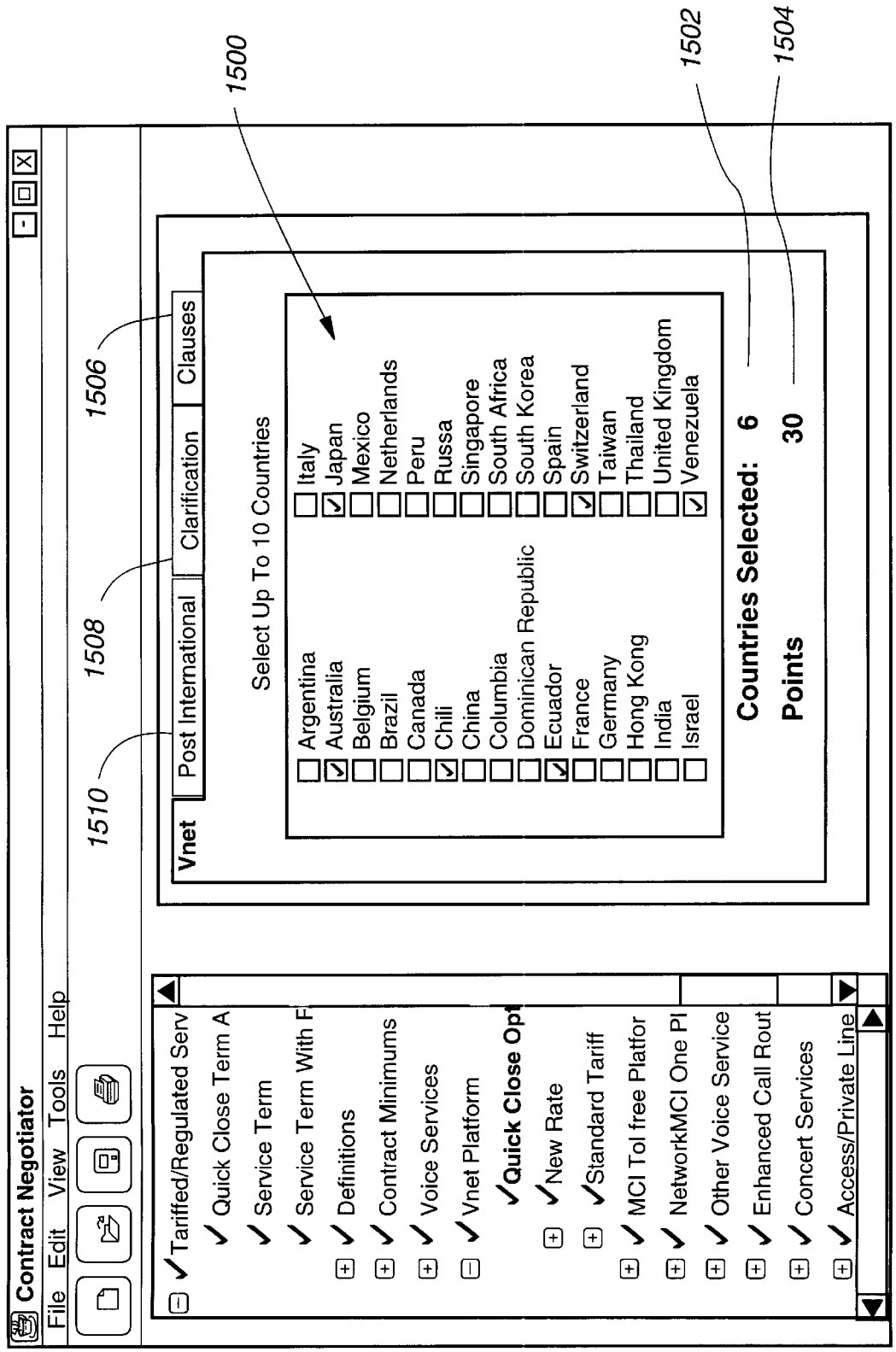
FIG. 15 illustrates a second exemplary Quick Close template in accordance with the present invention.

FIG. 15 illustrates two columns of check boxes shown generally at 1500. In this exemplary display, a user may allocate available points among the countries shown, up to a maximum of 10 countries. Specifically, FIG. 15 shows six countries selected as indicated by value 1502. The selection of six countries requires an allocation of 30 points (shown at 1504), in this example, which are applied against the total available points of FIG. 13. In addition, Class 4 users may enter clarifications, and all users may view the clarifications and clause text using tabs 1506 and 1508, as described for the Q&A template, the BLOB template and the No Pricing template.

Figure 16:
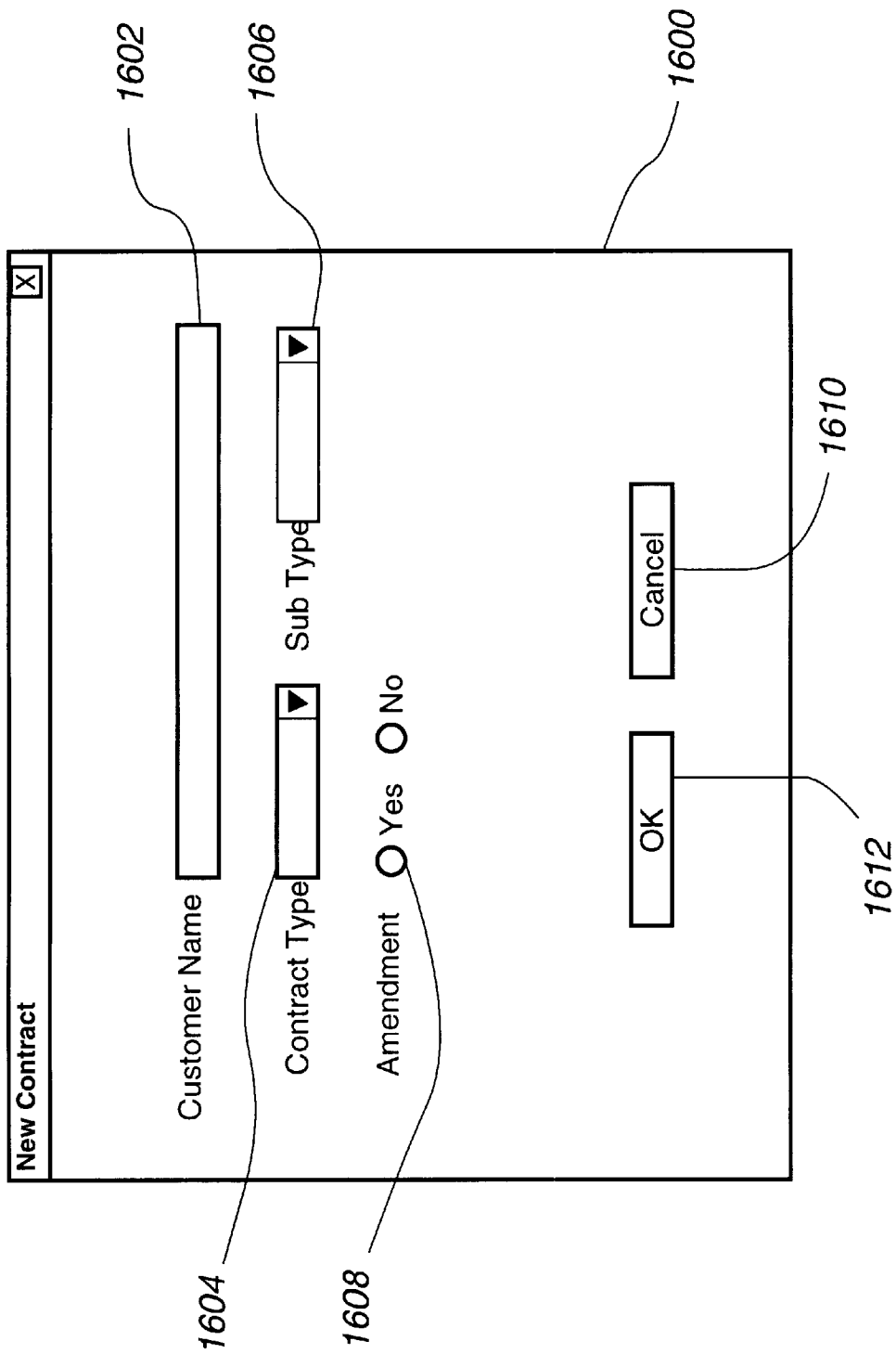
FIG. 16 illustrates a screen for entering a new contract into a system in accordance with the present invention.

As shown in FIG. 16, Class 1 users with a defined hierarchy are able to create new contracts. No other class users have this capability. When a new contract is requested, before a contract tree structure is displayed, a pop-up box (1600) is displayed to the user. Pop-up box 1600 prompts the Class 1 user to input the name of the customer in box 1602, the contract type in box 1604, and a subtype in box 1606. Contract types are defined by a Class 6 user and are constructed corresponding to the business requirements. Contract subtypes describe a hierarchical relationship among various contract types. The Class 1 user may indicate whether the new contract is an amendment to an old contract using radio buttons at 1608. An amendment has data storage dedicated to describing the history of the contract. For example, such information may identify the original contract or contracts from which the amendment derives. The Class 1 user may abort the initiation of a new contract by selecting "Cancel" button 1610. Otherwise, the Class 1 user may complete the initiation of a new contract by selecting "OK" button 1612. The Class 1 user may then begin entering terms and comments into the contract tree of the new contract. The new contract is not distributed to other team members corresponding to this new contract until the Class 1 user submits the contract for approval to a Class 4 user.

Class 6 users administer the contract negotiator system. Administration includes activities such as adding, editing, and removing new users from the system. Class 6 users also assign permanent hierarchies to Class 1 users and maintain clauses in contract baselines (i.e., default contract trees).

Figure 17:
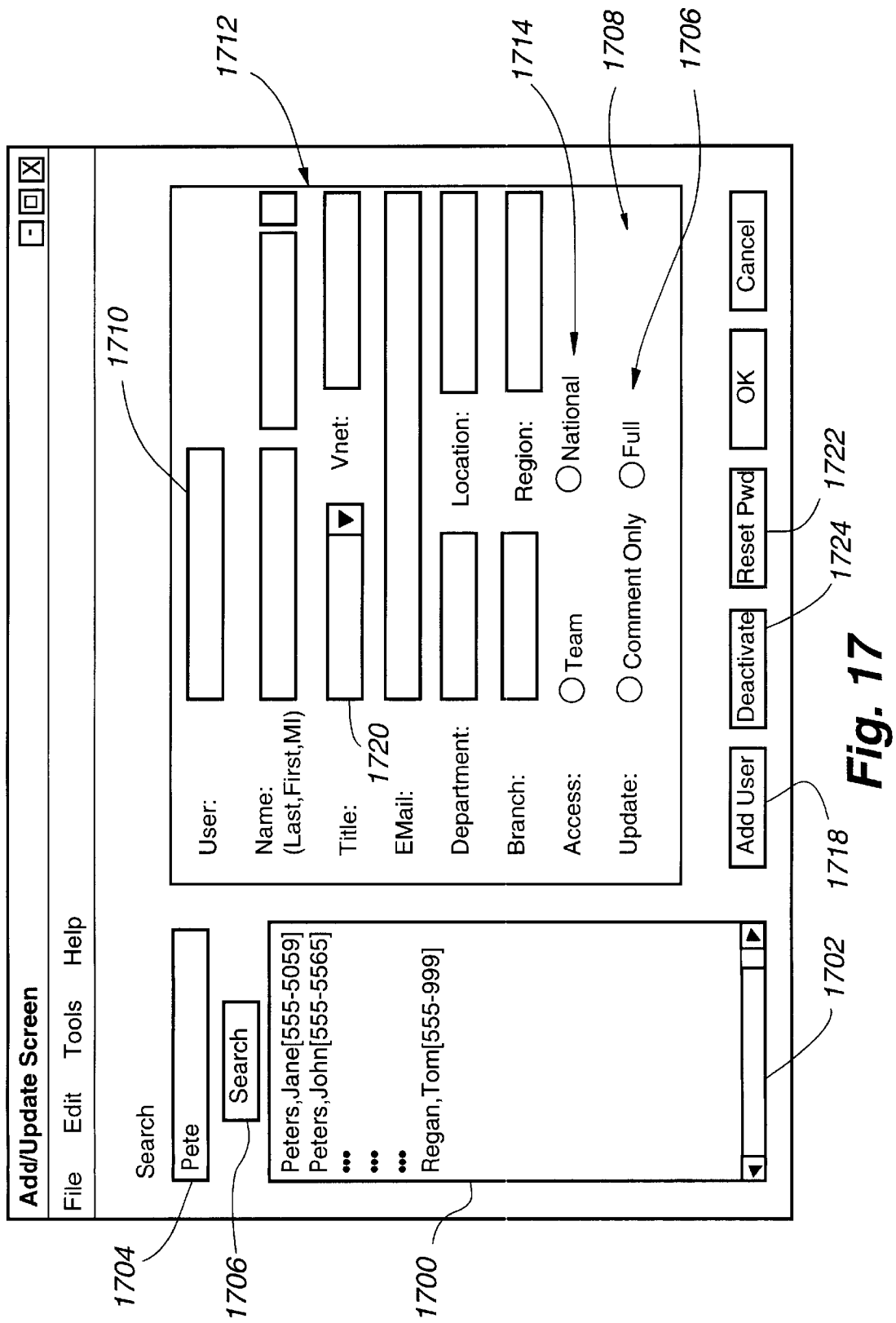
FIG. 17 illustrates a "User Entry/Maintenance" screen to allow a Class 6 user to manage users in a system in accordance with the present invention.

FIG. 17 shows a screen used by a Class 6 user to add and update users to a contract negotiator system. In list box 1700, the names of valid users within the system are displayed. If the list of names displayed in list box 1700 exceeds the visible work area, a vertical scroll bar is available to allow a user to scroll beyond the initially displayed area. Likewise, a horizontal scroll bar 1702 allows a user to scroll horizontally to view the entire length of a name entry. A Class 6 user may search for a name in list box 1700 using search box 1704 and search button 1706. To search for an existing user, a Class 6 user enters a partial or complete name of the desired user in the search box 1704. If the entered name is found after the Class 6 user presses the search button 1706, the name will be displayed within the boundaries of the displayed area in list box 1700. The Class 6 user can select the user name by double clicking on the name in the list box 1700. When selected, the details corresponding to the selected name appear in work area 1708. User box 1710 displays the User ID from the User table discussed previously. Likewise, the name, title and VNet number are also illustrated generally at 1712. A VNet number is an identifier that allows employees at remote locations to use MCI Telecommunication Corporation's VNet system to access advanced telecommunication capabilities. Other relevant information concerning the user is also identified generally at 1712. At 1714, two types of access rights are selectable. If "Team" is selected, the user only has access to those contracts for which he or she is a team member. If "National" is selected, the user has access to all contracts within the contract database. At 1716, restrictions on the write access rights granted to the user are selectable. If "Comment Only" is selected, the user may only make comments in a contract to which he or she has access. If "Full" is selected, the user has full read and write rights to those contracts in which he or she has access. These access rights may also be restricted by the current status of the contract. For example, if the current status of the contract is "Legal in Progress", a Class 1 user is restricted from modifying the contract.

A Class 6 user may add a user to the system by entering the appropriate data in the fields in work area 1708 and selecting the "Add User" button 1718. The user class and subclass are determined by the position title selected from the "Title" drop down list 1720. A subclass refers to a "point" class, such as "Class 2.1." When a user is added, a default password that equals their User ID is automatically assigned. When a password is reset using "Reset Pwd" button 1722, the user's password is reset to his or her User ID.

To edit the user information for an existing user, a Class 6 user selects the name of the user in list box 1700 and edits the information displayed in work area 1708. In this mode, "Add User" button 1718 is renamed "Update User." When the Class 6 user completes changes to the selected user's information, selecting the "Update User" button 1718 posts the changes to the contract database. During the edit process, the user is not removed from the system. The updates merely replaces the existing entry when the "Update User" button 1718 is selected.

To deactivate a user from the system, the Class 6 user selects the user from list box 1700. The user information is displayed in the work area 1708. If the Class 6 user selects the "Deactivate" button 1724, the user is flagged as "deactive" in the database. The user's record remains in the database for reference purposes, but that user is thereafter denied access (i.e., prevented from logging on) to the system. Furthermore, deactivated user records are not shown in lists for adding users to teams or hierarchies. Deactivated user records are displayed in the User Add/Update Screen with an indicator to allow a deactivated user to be reactivated. Users that are already included in permanent hierarchies may not be deactivated until they are removed from those hierarchies.

To reactivate a user, the Class 6 user edits the deactivated record. When the deactivated record is brought into edit mode, the "Deactivate" button 1724 is renamed "Reactivate." By selecting the "Reactivate" button, the user record is reactivated with the password set to the default (i.e., the User ID). Thereafter, the user may be added to teams and permanent hierarchies again.

Figure 18:
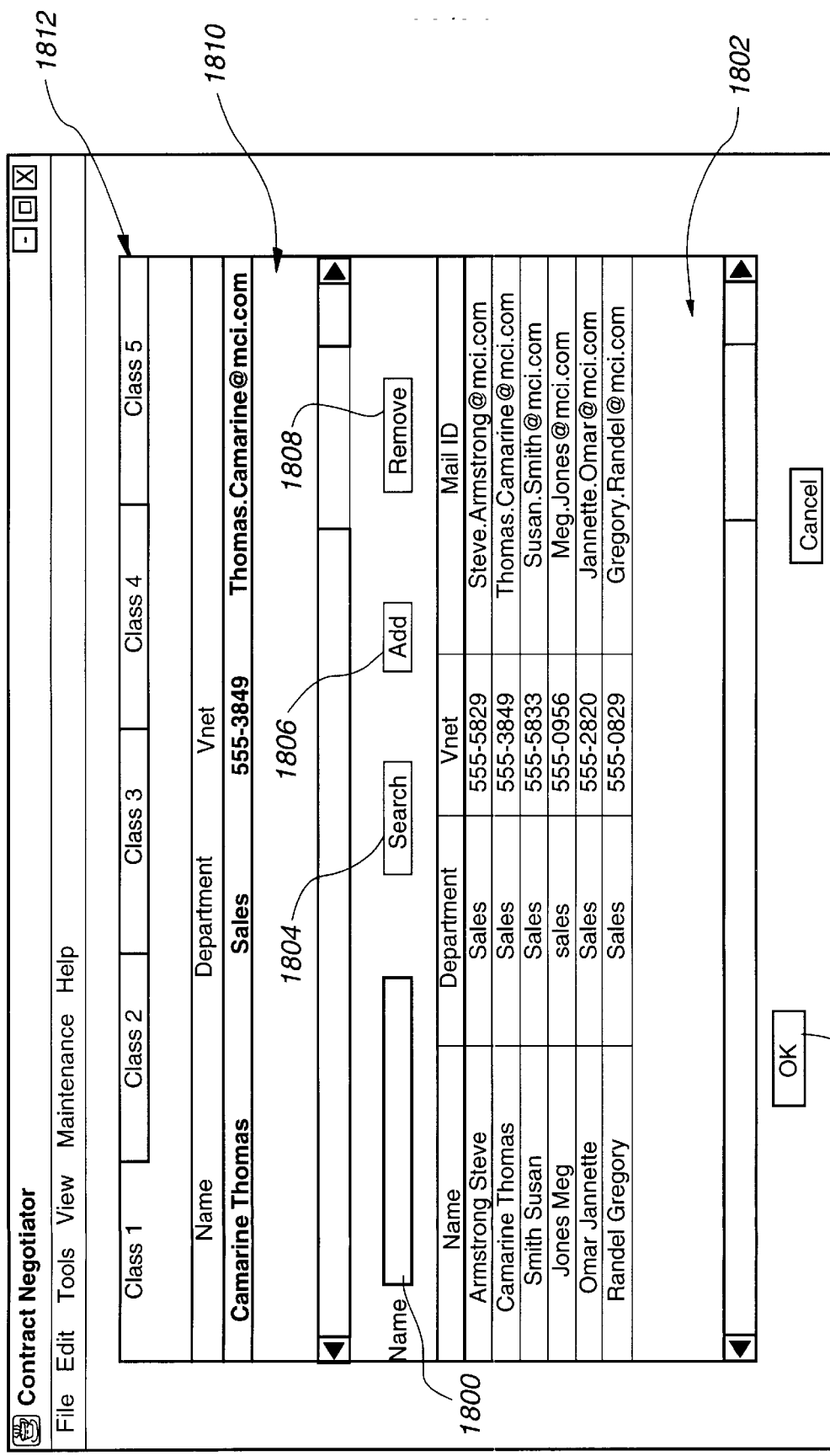
FIG. 18 illustrates a screen to allow a Class 6 user to manage class hierarchies according to a Class 1 user in accordance with the present invention.

FIG. 18 shows a screen that allows a Class 6 user to search all of the Class 1 users and to create or edit Class 1 permanent hierarchies. The Class 6 user enters the full or partial name of a Class 1 user in name field 1800. The system searches user names displayed in list box 1802 when the Class 6 user presses "Search" button 1804. If the user name entered in box 1800 is found, the name is displayed within the viewable area of list box 1802. The Class 6 user selects names from this list by clicking on the name in list box 1802. To add the selected name to a permanent hierarchy, a Class 6 user selects "Add" button 1806, which adds the name to the displayed list box at 1810. The names displayed in list box 1810 correspond to the selected tab of the five class tabs shown generally at 1812. Double clicking on a name in list box 1808 will also add it to the permanent hierarchy. To remove a user from a hierarchy, the Class 6 user selects the name of a user in list box 1810 and selects "Remove" button 1808.

When the permanent hierarchy screen initially appears to a Class 6 user, only the Class 1 tab is accessible. Once the Class 1 user is selected, however, the other tabs become accessible. A permanent hierarchy cannot be saved until all required hierarchy minimums have been established. Selecting "OK" button 1820 saves the permanent hierarchy in the database and dismisses the screen.

Figure 19:
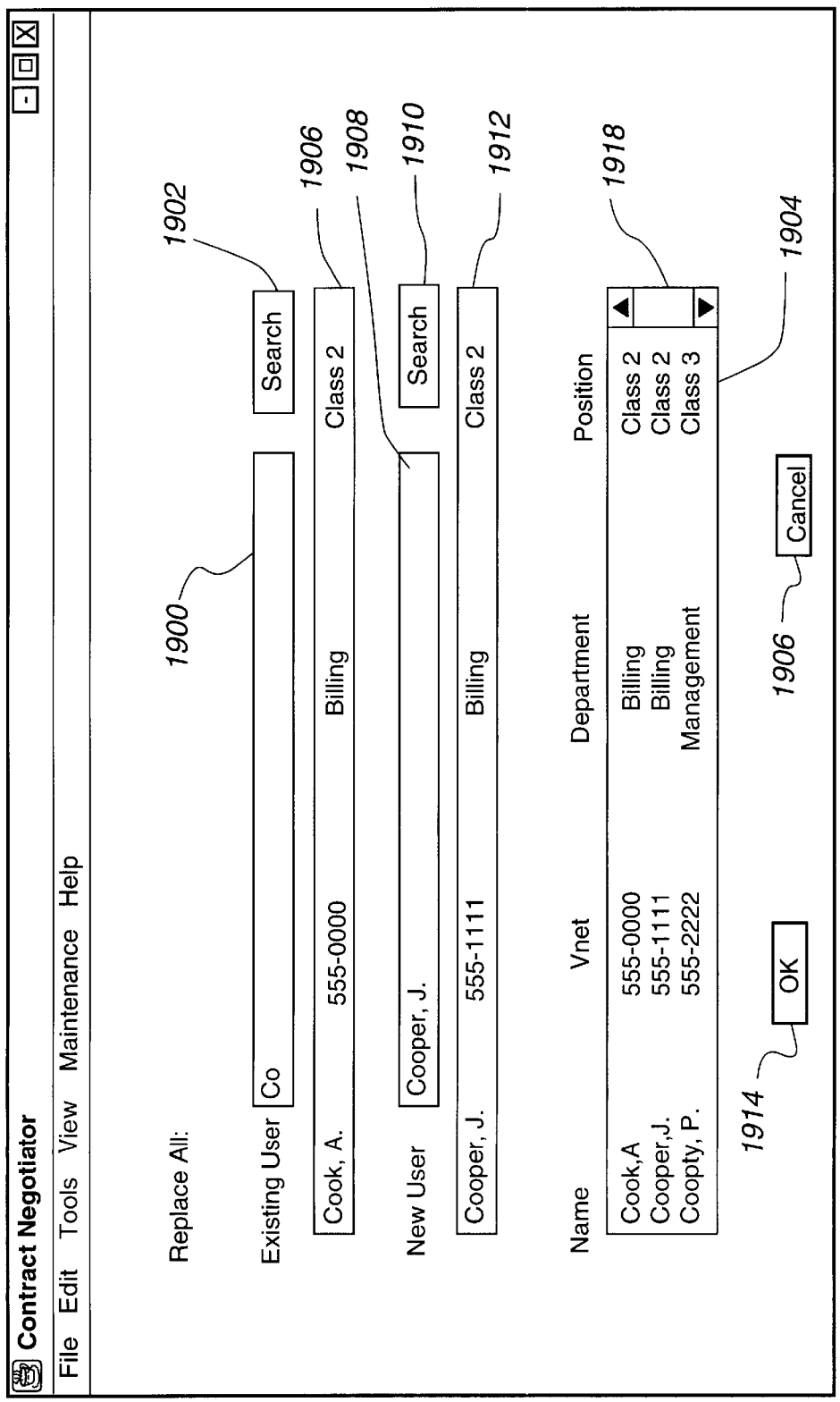
FIG. 19 illustrates a screen to allow a Class 6 user to globally replace instances of a user name within multiple hierarchies in accordance with the present invention.

FIG. 19 shows the "Replace All" screen, which allows a Class 6 user to replace one user for another in all permanent hierarchies in which the original user existed. To do so, a Class 6 user enters a full or partial name in the "Existing User" field 1900 and selects the "Search" button 1902. The search results are populated in bottom list box 1904, which includes vertical scroll bar 1918 to allow the user to view user names that exceed the visible area of the list box. The "Existing User" is selected by double clicking on the user entry in list box 1904, and the selected user is loaded into "Existing User" box 1906.

To select a new user to replace the original user in the permanent hierarchy, the Class 6 user enters a full or partial name in the "New User" field 1908 and selects "Search" button 1910. The search results are populated in bottom list box 1904. The Class 6 user selects the new user by double clicking on the user name in list box 1904, and the user name is loaded in box 1912. After the Existing and New Users are entered into boxes 1906 and 1912, the Class 6 user updates the permanent hierarchy in the database by pressing "OK" button 1914. Alternately, the Class 6 user may abort the "Replace All" action by pressing "Cancel" button 1916. The screen illustrated in FIG. 19 may be used to replace all instances of a user in all permanent hierarchies in the system, but instances where the user is included in a permanent hierarchy associated with a pending application, the Existing User name is not replaced.

Figure 20:
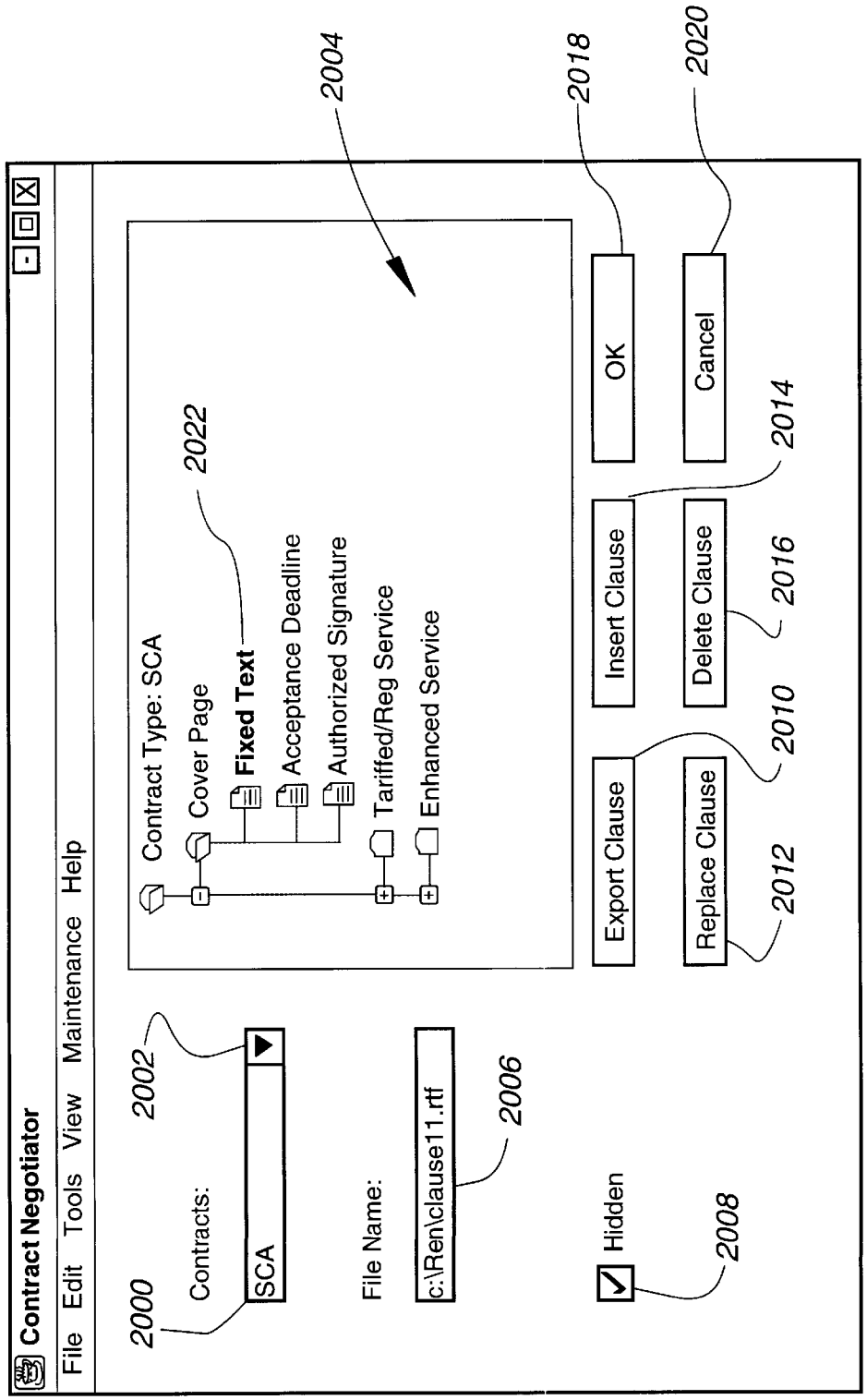
FIG. 20 illustrates a "Clause Support" screen to allow a Class 6 user to maintain clauses in a contract baseline in accordance with the present invention.

FIG. 20 shows a screen used by a Class 6 user to maintain the clauses in the contract baseline. The Class 6 user selects the contract type in drop box 2000. By pressing the down arrow at 2002, the Class 6 user is presented with a list of contract types supported within the system. The contract tree associated with the contract type is displayed in window 2004. The Class 6 user may expand the tree and select a textual clause for export, replacement, or deletion. Furthermore, a new clause may be inserted in the contract tree.

A contract clause (which corresponds to the Clause tab in a Q&A screen, for example) may be selected by clicking on the clause label, such as the "Fixed Text" clause label 2022. To export a clause to a file within a file system, the Class 6 user enters a valid file name in box 2006 and selects "Export Clause" button 2010. The text of the selected clause is then stored in the indicated file in RTF format. To replace a clause, the Class 6 user enters a valid file name in box 2006 and selects "Replace Clause" button 2012. The . RTF formatted text in the valid file name is associated with the selected clause label. To insert a clause, the Class 6 user enters a valid file name in box 2006, selects a clause label, such as "Fixed Text" label 2022, and selects the "Insert Clause" button 2014. The RTF-formatted text in the valid file name entered in box 2006 is associated with a new clause label inserted in the contract tree after the selected clause label. To delete a clause, the Class 6 user selects a clause label and selects "Delete Clause" button 2016, which removes the selected clause label from the contract tree. Clause labels may be renamed by a Class 6 user by selecting a clause label, pausing briefly, and selecting the same clause label for a second time. In this manner, the user may edit the clause label in accordance with the familiar Microsoft Windows RENAME style. The "hidden checkbox" 2008 can be checked to classify the clause as "hidden."

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Moreover, while there have been described herein the principles of the present invention in conjunction with a specific database configuration, it is to be clearly understood that the foregoing description is made only by way of example and not as a limitation to the scope of the invention. Particularly, it is recognized that the teachings of the foregoing disclosure will suggest other modifications to those persons skilled in the relevant art. Much of the modifications made involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present invention or of any further application derived therefrom.

What is claimed is:

1. A system for generating a contract comprising:
   a contract database that is accessible by a plurality of users and stores contract component data defining said contract;
   a client applet that provides access to said contract database for said plurality of users;
   a first server coupled to said client applet; and
   a second server coupled to said contract database and said first server that updates said contract database with modifications to said contract component data received from said client applet through said first server.

2. The system of claim 1 wherein said contract database defines a hierarchy associated with said contract comprising team members selected from said plurality of users and allocated into class levels within said hierarchy.

3. The system of claim 2 wherein said client applet has an interface that displays said contract component data and receives input from said team members to modify said contract component data.

4. The system of claim 2 wherein said contract database has a contract status field, said client applet controlling access to said contract database by one of said team members based on said contract status field and said class level of said one of said team members.

5. The system of claim 1 wherein said contract database comprises:
   a contract tree table that identifies a current contract component of said contract database, a parent component of said current contract component, an order value defining an ordinal relationship between said current contract component and at least one other component associated with said parent component, and a status for said current contract component; and
   a component table that defames a component ID associated with said current component.

6. The system of claim 1 wherein said contract database comprises:
   one or more user data tables that define at least one of said plurality of users and at least one relationship between each defined user and said contract.

7. The system of claim 1 wherein said contract database comprises:
   a query table associated with a component of said contract having question text to be displayed to said one of said plurality of users accessing said component; and
   a response table associated with said query table comprising fields for storing a response to said question text from said one of said plurality of users.

8. The system of claim 7 wherein said response table comprises a User ID for indicating an identity of said one of said plurality of users that responded to said question text.

9. The system of claim 1 wherein said contract database comprises:
   a point table that stores data required to calculate a total number of available points for said contract to assure that said contract conforms to predetermined contract requirements; and
   one or more options tables required to allocate said total number of available points among various contract options.

10. The system of claim 9 wherein said client applet includes an available points interface that solicits input from one of said plurality of users to calculate said total number of available points.

11. The system of claim 9 wherein said client applet includes a contract options interface that solicits point allocation selections from one of said plurality of users.

12. The system of claim 1 wherein said client applet includes an interface screen corresponding to a generic template table that defines an amount of database storage required to store data associated with said interface screen.

13. The system of claim 1 further comprising a back-office computer system coupled to said second server that executes a back-office application using said contract component data stored in said contract database and communicated to said back-office system.

14. A method for negotiating a contract comprising the steps of:
   providing a user-operable contract negotiator applet on a client computer;
   providing access to a contract database by a first user via said contract negotiator applet, said contract database storing a plurality of contract components;
   displaying information relating to a selected one of said plurality of contract components;
   storing data received from said contract negotiator applet to said contract database;
   submitting to a second user a contracts team list to which said second user is assigned as a team member; and
   providing access to said contract database to said second user via said contract negotiator applet, responsive to said submitting step.

15. The method of claim 14 wherein the submitting step comprises the step of changing a value in a contract status field in said contract database.

16. The method of claim 14 wherein said step of providing access to said contract database by a second user via said contract negotiator applet comprises the step of presenting said second user with a list of contracts for which said second user is a team member.

17. The method of claim 14 further comprising the steps of:
   receiving an approval status from said second user;
   distributing said contract components to a third user;
   providing access to a contract database by said third user via said contract negotiator applet, responsive to said distributing step; and generating a summary of said contract components to said third user.

18. The method of claim 14 further comprising the steps of:
   receiving an approval status from said second user; and
   generating said contract comprising said contract components to said first user.

19. The method of claim 14 further comprising the steps of:
   providing read access by a third user to said contract database;
   providing comment access by said third user to said contract database,
   storing comment data provided by said third user in said contract database;
   preventing said third user from adding to said contract components; and
   preventing said third user from modifying said contract components.

20. A system for automating a negotiation of a contract comprising:
   a user-operable contract negotiator applet on a client computer;
   means for providing access to a contract database by a first user via said contract negotiator applet, said contract database storing a plurality of contract components;
   means for displaying information relating to at least one of said plurality of contract components;
   means for storing data responsive to said displayed information into said contract database;
   a status field in said contract database that causes said contract components to be submitted to a second user in said contract database if said status field is set to a submitted value; and
   means for providing access to a contract database by said second user via said contract negotiator applet, responsive to said status field.

21. The system of claim 20 further comprising:
   means for categorizing said first and second users according to user classes; and
   means for controlling read and write access to said contract database according to said status field and said user classes.

22. The system of claim 20 further comprising means for recording a text field for a user comment, a user identifier for a user entering said user comment, a comment type field for associating said user comment to a contract section relating to said user comment, and a time field specifying a time of entry for said user comment.

23. A method for accessing a contract database via a contract negotiator applet comprising the steps of:
   providing a web server computer that stores said contract negotiator applet;
   providing a client computer coupled to said web server computer;
   loading said contract negotiator applet to said client computer from said web server computer;
   executing said contract negotiator applet on said client computer;
   providing a contract database coupled to a broker; and
   accessing said contract database by said contract negotiator applet via said broker.

24. The method of claim 23 further comprising the steps of:
   providing a proxy server residing on said web server and coupled to said client computer;
   initiating a central registry coupled to said proxy server;
   initiating a broker coupled to said proxy server and said central registry, responsive to said step of initiating said central registry;
   registering said broker in said central registry;
   receiving a request to said proxy server from said contract negotiator applet for access to said broker;
   obtaining from said central registry a broker reference corresponding with said broker; and
   binding said contract negotiator applet to said broker.

25. The method of claim 23 further comprising the step of updating contract components in said contract database with user-supplied input received by said contract negotiator applet.

26. The method of claim 23 further comprising the steps of:
   receiving an approval of a version of a contract in said contract database,
   storing said approved version of said contract in said contract database; and
   creating a new version of said contract in said contract database, responsive to said approval step.

27. A method for generating a contract having terms that conform to a set of predetermined contract parameters, comprising the steps of:
   assigning a number of contract points to define said set of predetermined contract parameters;
   assigning a number of contract points to define said set of predetermined contract parameters;
   assigning said number of contract points to a total available points value;
   assigning a predetermined option point value to a contract option;
   receiving a selection of said contract option for inclusion in said contract; and
   deducting said predetermined option point value from said total available points value to automate the generation of the contract.

28. The method of claim 27 wherein said contract has a duration and said step of assigning a number of contract points to define said set of predetermined contract parameters comprises the step of setting said number of contract points equal to a point value as a function of projected revenue over said duration of said contract.

29. The method of claim 27 wherein said contract has a duration and the step of assigning a number of contract points to define said set of predetermined contract parameters comprises the step of setting said number of contract points equal to a point value based on a combination of said duration of said contract and an annual level of said projected revenue of said contract.

30. The method of claim 27 wherein the step of assigning a predetermined option point value to a contract option comprises the step of assigning a point value to a discount option.

31. The method of claim 27 wherein the step of assigning a predetermined option point value to a contract option comprises the step of assigning a point value to a service rate cap option.

32. The method of claim 27 wherein the step of assigning a predetermined option point value to a contract option comprises the step of assigning a point value that increases with a number of countries serviced.

33. The method of claim 27 further comprising the step of receiving an approval status within an expedited time frame if, responsive to said deducting step, said total available points are not less than zero.

34. A system for automatically generating a contract among multiple users coupled to a network, said contract having a duration and terms that conform to a set of predetermined contract parameters, comprising:
   a database having data defining said contract;
   a first field in said database that stores a total available points value defining said set of predetermined contract parameters, said total available points value being a function of projected revenue over said duration of said contract;
   a second field in said database that stores a predetermined option point value to a contract option;
   a client applet that presents a user interface to allow a user to select said contract option for inclusion in said contract;
   a third field in said database that stores a difference between said predetermined option point value and said total available points, responsive to said selected contract option.

35. A system for automatically generating a contract among multiple users coupled to a network, said contract having a duration and terms that conform to a set of predetermined contract parameters, comprising;
   first means for storing a total available points value defining said set of predetermined contract parameters, said total available points value being a function of projected revenue over said duration of said contract;
   second means for storing a predetermined option point value to a contract option;
   means for selecting said contract option for inclusion in said contract;
   means for deducting said predetermined option point value from said total available points, responsive to said selected contract option.

36. The system of claim 35 further comprising means for receiving an approval status within an expedited time frame if, responsive to said deducting step, said total available points are not less than zero.

37. A method of generating a contract comprising the steps of:
   defining a hierarchy of users having a first class of users and a second class of users;
   assigning said hierarchy of users to a contract initiator;
   inputting a proposed contract into a contract negotiation system from said contract initiator;
   assigning to a proposed contract said hierarchy of users assigned to said contract initiator;
   distributing via said contract negotiation system said proposed contract to members of said first and second classes of users of said hierarchy;
   submitting said proposed contract to said second class of users with at least one approval from said first class of users;
   receiving at least one approval from said second class of users, responsive to the step of submitting said proposed contract to said second class of users; and
   generating a contract-based document, responsive to said receiving step.

38. The method of claim 37 wherein the step of generating a contract-based document comprises the step of generating a contract summary to one of said second class of users that comprises information used to draft said contract.

39. The method of claim 37 wherein the step of generating a contract-based document comprises the step of generating said contract to one of said contract initiator.

40. The method of claim 37 wherein the step of assigning a hierarchy of users comprises the step of selecting said hierarchy of users from a list of available users associated with each class.

41. A process for managing user access to a sharable contract database, said method comprising the steps of:
   providing said sharable contract database of editable data defining a contract as a plurality of discrete contract components;
   assigning a class level to each user in a hierarchy of users having access to said sharable contract database;
   assigning to said contract a contract status indicator that is stored in said sharable contract database and indicates a negotiation status of said contract that is capable of changing during said process;
   generating a dynamic user access mode based on said class level and said contract status indicator; and
   preventing a user in said hierarchy of users from changing said contract status indicator, based on said dynamic user access mode.

42. The method of claim 41 further comprising the step of preventing a user in said hierarchy of users from modifying one of said plurality of discrete contract components, based on said dynamic user access mode.

43. The method of claim 41 further comprising the step of tracking previous versions of one of said modified discrete contract components.

44. The method of claim 41 further comprising the step of associatively tracking an identity of a user who modifies one of said modified discrete contract components.

45. An automated contract negotiation system, having a plurality of users coupled to a communication network, for managing user access to a contract, said system comprising:
   a sharable contract database of editable data defining said contract as a plurality of discrete contract components that has a class level assigned to each user in a hierarchy of user having access to said sharable contract database;
   a contract status indicator field in said sharable contract database that indicates a negotiation status of said contract and is capable of changing during an automated contract negotiation process;
   a client applet for providing access to said sharable contract database to said plurality of users;
   a first server coupled to said client applet;
   a second server coupled to said sharable contract database and said first server that updates said sharable contract database; and
   at least one database field in said sharable contract database that indicates a dynamic user access mode based on said class level and said contract status indicator field, said dynamic user access mode being capable of preventing a user in said hierarchy of users from changing said editable data in said sharable contract database.

46. A program storage medium, readable by a computer, tangibly embodying a program of instructions executable by said computer for generating a contract having terms that conform to a set of predetermined contract parameters, the program comprising instructions for:

assigning a number of contract points to define said set of predetermined contract parameters;

assigning said number of contract points to a total available points value;

assigning a predetermined option point value to a contract option;

receiving a selection of said contract option for inclusion in said contract;

deducting said predetermined option point value from said total available points value; and displaying said total available points value, responsive to said deducting step to generate a contract among multiple users coupled to a network from said selection of contract option.

47. A computer program for executing a computer process, said computer program being readable from a storage medium by a computing system and encoding a program of instructions for negotiating an contract, said computer process comprising the steps of:

providing a user-operable contract negotiator applet on a client computer;

providing access to a contract database by a first user via said contract negotiator applet, said database storing a plurality of contract component tables;

displaying information relating to a selected one of said plurality of contract components storing data received from said contract negotiator to said contract database;

submitting said contract components to a second user in said contract database; and providing access to a contract database by said second user via said contract negotiator applet, responsive to said submitting step.

48. A method of creating a contract type within a contract negotiator system comprising multiple users coupled to a network, the method comprising the steps of:

providing a first generalized template and a second generalized template that define database storage in a contract database;

defining at least one contract component of said new contract including said first generalized template;

defining a contract tree including said at least one contract component;

storing display data in said first generalized template;

displaying said displaying data in an applet;

receiving response data in said applet; and storing said response data in said second generalized template to create said contract within said contract negotiator system.

49. The method of claim 48 wherein the step of defining at least one contract component comprises the steps of:

assigning a data type indicator to said second generalized contract template; and associating said second generalized template to said at least one contract component according to said data type indicator of said second generalized template.

* * * * *